(12) United States Patent
Ye et al.

(10) Patent No.: US 12,439,435 B2
(45) Date of Patent: Oct. 7, 2025

(54) RESOURCE ALLOCATION FOR CO-CHANNEL COEXISTENCE

(71) Applicant: APPLE INC., Cupertino, CA (US)

(72) Inventors: Chunxuan Ye, San Diego, CA (US); Chunhai Yao, Beijing (CN); Dawei Zhang, Saratoga, CA (US); Haitong Sun, Cupertino, CA (US); Hong He, San Jose, CA (US); Oghenekome Oteri, San Diego, CA (US); Seyed Ali Akbar Fakoorian, San Diego, CA (US); Sigen Ye, San Diego, CA (US); Wei Zeng, Saratoga, CA (US); Weidong Yang, San Diego, CA (US)

(73) Assignee: APPLE INC., Cupertino, CA (US)

( * ) Notice: Subject to any disclaimer, the term of this patent is extended or adjusted under 35 U.S.C. 154(b) by 92 days.

(21) Appl. No.: 18/475,696

(22) Filed: Sep. 27, 2023

(65) Prior Publication Data
US 2024/0023146 A1  Jan. 18, 2024

Related U.S. Application Data

(63) Continuation of application No. 17/593,388, filed as application No. PCT/CN2021/116276 on Sep. 2, 2021, now Pat. No. 12,156,238.

(51) Int. Cl.
*H04W 72/40* (2023.01)
*H04B 17/318* (2015.01)
(Continued)

(52) U.S. Cl.
CPC .......... *H04W 72/40* (2023.01); *H04B 17/328* (2023.05); *H04W 72/02* (2013.01); *H04W 72/563* (2023.01)

(58) Field of Classification Search
CPC ... H04W 75/563; H04W 48/12; H04W 72/02; H04W 72/40; H04B 17/328
See application file for complete search history.

(56) References Cited

U.S. PATENT DOCUMENTS

| 2020/0229194 A1 | 7/2020 | Belleschi et al. |
| 2020/0351057 A1 | 11/2020 | Yeo et al. |

(Continued)

FOREIGN PATENT DOCUMENTS

| CN | 111083732 A | 4/2020 |
| CN | 111278126 A | 6/2020 |

(Continued)

OTHER PUBLICATIONS

U.S. Appl. No. 17/593,388, Final Office Action, May 29, 2024, 9 pages.
(Continued)

*Primary Examiner* — Andrew Lee
(74) *Attorney, Agent, or Firm* — Dorsey & Whitney LLP

(57) ABSTRACT

Systems and methods for user equipment (UE) capable of performing sidelink (SL) communications that account for overlapped SL resource pools of multiple radio access technologies (RATs) are disclosed. A UE may select, based on prioritizing non-overlapped resources over overlapped resources, one or more candidate resources and/or one or more transmission resources; may determine a power control configuration without considering SL pathloss corresponding to a first RAT when a second power control configuration determination for a second RAT does not consider SL pathloss; may select physical sidelink feedback channel (PSFCH) locations for PSFCH use from first PSFCH locations of resources of a first SL resource pool on a first RAT that do not overlap with a second SL resource pool on a second RAT according to a bitmap; and/or may
(Continued)

select one of a PSFCH transmission and PSFCH reception using a data priority rule and/or a pool sharing rule.

11 Claims, 16 Drawing Sheets

(51) Int. Cl.
  *H04W 72/02* (2009.01)
  *H04W 72/563* (2023.01)

(56) References Cited

U.S. PATENT DOCUMENTS

| | | | |
|---|---|---|---|
| 2021/0028910 A1* | 1/2021 | Cheng | H04L 5/0064 |
| 2021/0250772 A1 | 8/2021 | Farag | |
| 2022/0086700 A1 | 3/2022 | Nguyen et al. | |
| 2022/0116996 A1* | 4/2022 | Lee | H04W 74/0816 |
| 2022/0312422 A1 | 9/2022 | Lee et al. | |
| 2022/0346180 A1 | 10/2022 | Tseng et al. | |
| 2022/0377704 A1* | 11/2022 | Xue | H04W 72/02 |
| 2022/0408373 A1 | 12/2022 | Castañeda Garcia et al. | |
| 2023/0010997 A1* | 1/2023 | Xue | H04L 1/1812 |
| 2023/0025259 A1 | 1/2023 | Farag et al. | |
| 2023/0040453 A1* | 2/2023 | Hosseini | H04W 8/24 |
| 2023/0063943 A1 | 3/2023 | Ding et al. | |
| 2023/0199724 A1 | 6/2023 | Ko et al. | |
| 2023/0254831 A1 | 8/2023 | Su et al. | |
| 2023/0276461 A1* | 8/2023 | Lee | H04W 72/02 370/329 |
| 2023/0300799 A1 | 9/2023 | Lee | |
| 2023/0354468 A1 | 11/2023 | Park et al. | |
| 2024/0080805 A1* | 3/2024 | Lee | H04B 17/328 |
| 2024/0137159 A1* | 4/2024 | Lee | H04L 5/0055 |

FOREIGN PATENT DOCUMENTS

| | | |
|---|---|---|
| EP | 4376530 A2 | 5/2024 |
| WO | 2020033628 A1 | 2/2020 |
| WO | 2020215996 A1 | 10/2020 |
| WO | 2020221199 A1 | 11/2020 |

OTHER PUBLICATIONS

PCT/CN2021/116276, International Search Report and Written Opinion, Jun. 1, 2022, 9 pages.
Vivo, "Tx and Rx resource pool definition for NR V2X sidelink", R2-1905848, 3GPP TSG-RAN WG2 Meeting #106, Reno, Nevada, USA, Agenda Item 11.4.4, May 13-17, 2019, 3 pages.
U.S. Appl. No. 17/593,388, Non-Final Office Action, Dec. 28, 2023, 9 pages.
U.S. Appl. No. 17/593,388, Notice of Allowance, Aug. 23, 2024, 6 pages.
Dahlman, Erik, "5G NR The Next Generation Wireless Access Technology", Second Edition, Elsevier, Academic Press, 2021, pp. 467-470.
Oppo, "Discussions on resource reservation, sensing and selection in Mode 2", R1-1912794, 3GPP TSG-RAN WG1 Meeting #99, Reno, Nevada, Agenda Item 7.2.4.2.2, Nov. 18-22, 2019, 12 pages.
Castaneda Garcia, et al., "A Tutorial on 5G NR V2X Communications", arxiv.org, Cornell University Library, 201 Olin Library Cornell University Ithaca, NY 14853,, Feb. 8, 2021, 55 pages.

* cited by examiner

RESOURCE ALLOCATION FOR CO-CHANNEL COEXISTENCE

CROSS-REFERENCE TO RELATED APPLICATIONS

This application is a continuation of U.S. patent application Ser. No. 17/593,388, filed Sep. 17, 2021, which is a national stage application filed under 35 U.S.C. § 371 of International Patent Application No. PCT/CN2021/116276, filed on Sep. 2, 2021, each of which is hereby incorporated by reference herein in its entirety.

TECHNICAL FIELD

This application relates generally to wireless communication systems, including such systems using user equipment (UE) that implement sidelink (SL) communications in areas/circumstances where multiple SL resource pools of multiple radio access technologies (RATs) may overlap.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a or g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
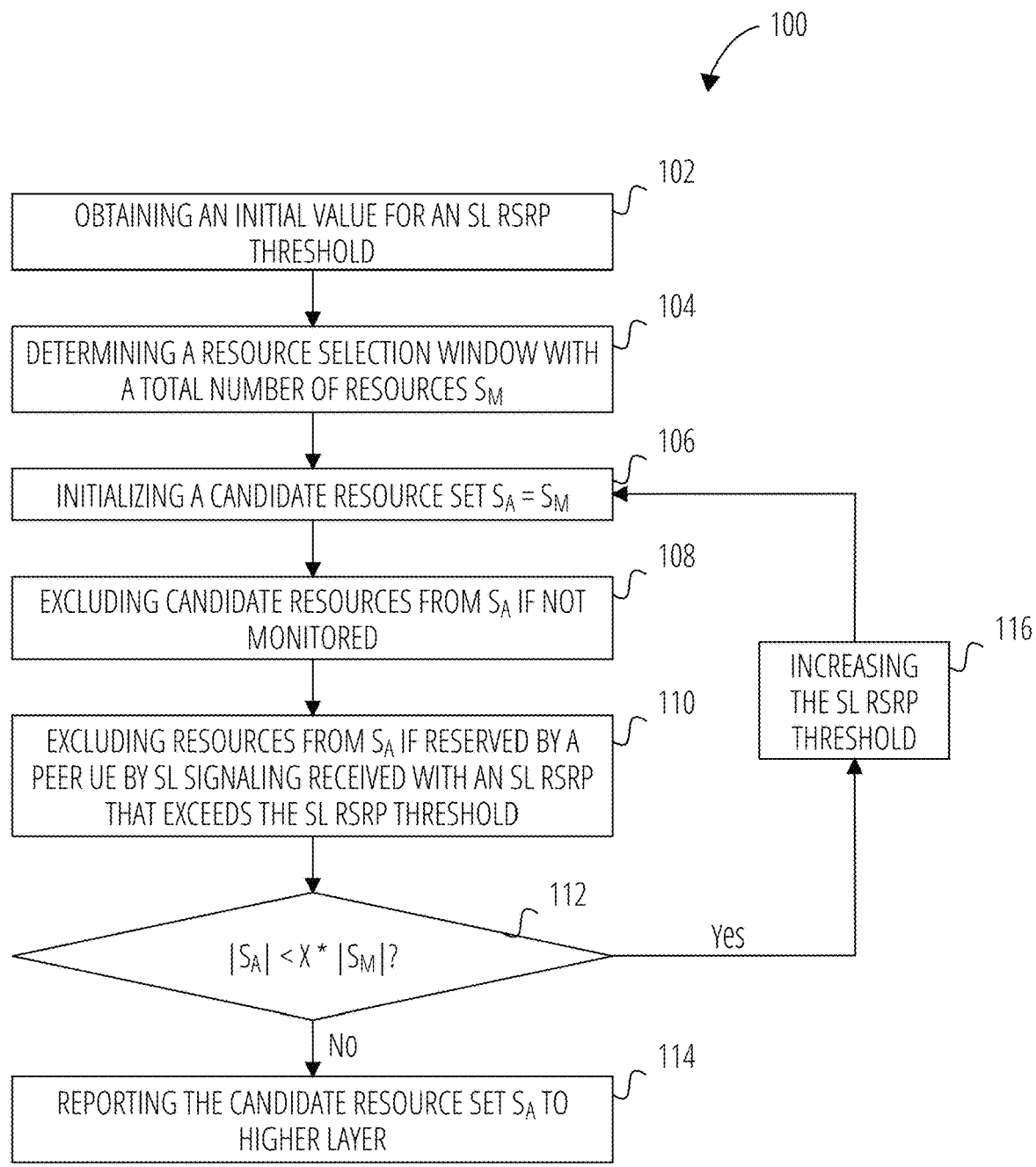
FIG. 1 illustrates a method of a UE for performing NR SL in a Mode 2 resource allocation scheme, according to an embodiment.

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

UEs may support one or more sidelink (SL) mechanisms, whereby a UE communicates with another (peer) UE using signaling sent from one of the UE directly to the other of the UE (e.g., without any intermediate device relaying those signals between the UE). A UE may use or implement a type of SL that corresponds to one or more RATs used by the UE. For example, a UE may be able to use or implement one or more of an NR SL, an LTE SL, etc. One example of an NR SL may be NR vehicle-to-everything (V2X) SL, and an example of an LTE SL may be LTE V2X SL.

Note that while embodiments disclosed herein may illustrate their corresponding principles using descriptions of SL on particular RAT types (e.g., NR RAT, LTE RAT), the particular RAT types used in such examples should be understood to be provided by way of example and not by way of limitation. Persons of ordinary skill in the art will understand that the principles discussed herein could be implemented relative to an environment using RAT type(s) other than those particularly provided for by way of example in the description of any given embodiment herein.

Considerations of co-channel coexistence between SL mechanisms of multiple RATs are discussed herein. It may be that a first resource pool used by UEs for LTE SL may overlap (in time and frequency) at least in part with a resource pool used by the UEs found in the same general geographical region for NR SL. In other words, the NR SL resource pool and the LTE SL resource pool may be in a state of "co-channel coexistence." As one example: in at least some regions, there is a the current proliferation of LTE enabled UE that may accordingly use LTE SL on an LTE SL resource pool, while at the same time the region experiences an increase in the use of NR enabled UE (which may be the same and/or different UE) that may accordingly use NR SL on an NR SL resource pool that is at least partially overlapped in time and frequency with the LTE SL resource pool. It may thus be that the overlapped portions of the SL resource pools of the different RATs can be said to interfere or collide with each other at the physical level, in the sense that it is possible that SL transmissions (e.g., from different UEs) that happen to simultaneously occur on the different RATs on overlapped resources of the overlapped SL resource pools and in the same area may interfere or collide.

In these types of cases, it may be beneficial to support resource allocation procedures for SL that can account for impacts of any overlap between SL resource pools of different RATs. Sharing of power control resources between LTE SL and NR SL may also be considered in beneficial ways in view of the overlap. Finally, it may be beneficial to support methods of handling physical sidelink feedback channel (PSFCH) use in SL that accounts for any overlap between SL resource pools of different RATs.

NR SL may allocate or schedule resources according to one of multiple possible modes. In a Mode 1 resource allocation scheme for NR SL, a network of the wireless communication system is responsible for coordinating the scheduling of SL resources of a SL resource pool on the corresponding RAT that are used by one or more UE to perform sidelink operations (SL transmission and/or SL reception). In a Mode 2 resource allocation scheme for NR SL, a UE may autonomously schedule resources of such a SL resource pool for its own use.

FIG. 1 illustrates a method 100 of a UE for performing NR SL in a Mode 2 resource allocation scheme, according to an embodiment. The method 100 includes obtaining 102 an initial value for an SL RSRP threshold (e.g., from a network corresponding to the NR RAT, or according to a pre-configuration at the UE). The initial value for the SL RSRP threshold may correspond to a quality of service (QoS) priority of data that is to be sent on the NR SL.

The method 100 further includes determining 104 a resource selection window with a total number of resources $S_M$. The resource selection window may analytically overlay (and thus include in $S_M$) resources of the SL resource pool that fall within a time range of the selection window. The time range of the selection window may extend from, for example, at or near the time that a need to transmit data on SL is realized at the UE and until the time as a latency budget for the data expires.

The method 100 further includes initializing 106 a candidate resource set $S_A S_M$. Once so initialized, $S_A$ begins with all of the resources in the selection window as (tentative) candidate resources.

The method 100 further includes excluding 108 any resources from $S_A$ if those resources have not been monitored for. It may be, for example, that a UE can monitor for resources in $S_A$ by sensing for SCI sent by peer UEs that include reservation(s) of one or more of the resources in $S_A$. This SCI may have been sent during a sensing window of the SL resource pool corresponding to a time period beginning prior to and running up to the time that the need to transmit the data on SL is realized at the UE. SCI for a given resource from $S_A$ may be monitored for at location(s) corresponding to resource reservation periods for the resource found in resource pool configuration information. If it is the case that the UE has not been monitoring for the SCI corresponding to a given resource in $S_A$ (e.g., using the corresponding resource reservation periods), the UE will not have sufficient information to determine whether it has already been reserved by a peer UE. Such resources are removed from $S_A$.

The method 100 further includes excluding 110 resources from $S_A$ if reserved by a peer UE by SL signaling received with an SL RSRP that exceeds (or is equal to or exceeds) an RSRP threshold. The SCI sensed at the UE may include reservations of resources within $S_A$, in the manner described. In each such case, the UE may measure an SL reference signal received power (RSRP) of a transmission by the peer UE in the slot of the SCI. If this SL RSRP exceeds (or is equal to or exceeds) the SL RSRP threshold, the resource of that corresponding SCI is removed from $S_A$, to prevent the UE from using the resource for transmission and causing a high level of interference with the peer UE's use of the resource. If the measured SL RSRP is equal to or less than (or less than) the SL RSRP threshold, it may be that the level of interference that would be caused should the resource be used by both the UE and the peer UE is not relatively as high. Accordingly, the resource remains in $S_A$ in this case.

The method 100 further includes determining 112 whether $|S_A| < X^* |S_M|$, where:
  $|S_A|$ is the number of resources that remain in $S_A$ (the number of remaining (tentative) candidate resources);
  X is a ratio between 0 and 1; and
  $|S_A|$ is the number of resources in $S_M$ (the total number of resources in the resource selection window).

In other words, the determining 112 is used to determine whether or not at least a given percentage (corresponding to the ratio X) of the resources defined by the resource selection window remain (tentative) candidate resources of $S_A$ after the excluding 108 and the excluding 110 are performed on $S_A$.

The ratio X may be configured or pre-configured to the UE (e.g., in configuration information for the NR SL resource pool). In some embodiments, it is contemplated that the ratio X could be, for example, 0.20, 0.35, 0.50, etc.

If $|S_A|$ is less than (or less than or equal to) the value of $X*|S_M|$, then the UE determines that there are too few resources left in the candidate resource set $S_A$. Accordingly, the UE proceeds to increasing 116 the RSRP threshold and then proceeding with the initializing 106 through the determining 112 again. The effect of the increased RSRP threshold is to (potentially) cause, during the subsequent re-performance of the initializing 106 through the determining 112, fewer resources are removed from S A during the excluding 110, thereby (potentially) changing the result of the determining 112.

After zero or more such loops back to the initializing 106, once the determining 112 finds that the value of $|S_A|$ is greater than or equal to (or greater than) the value of $X*|S_M|$, the UE determines that there are sufficient resources left in the candidate resource set $S_A$ for use by higher layers of the UE. Accordingly, the resources in $S_A$ are considered at this juncture candidate resources (rather than tentative candidate resources). The UE accordingly proceeds to reporting 114 the candidate resource set $S_A$ to the higher layer. Then one or more of the reported candidate resources (e.g., one to three of the reported candidate resources) are then selected from $S_A$ by the UE and are used as transmission resources to transmit on the SL.

Figure 2:
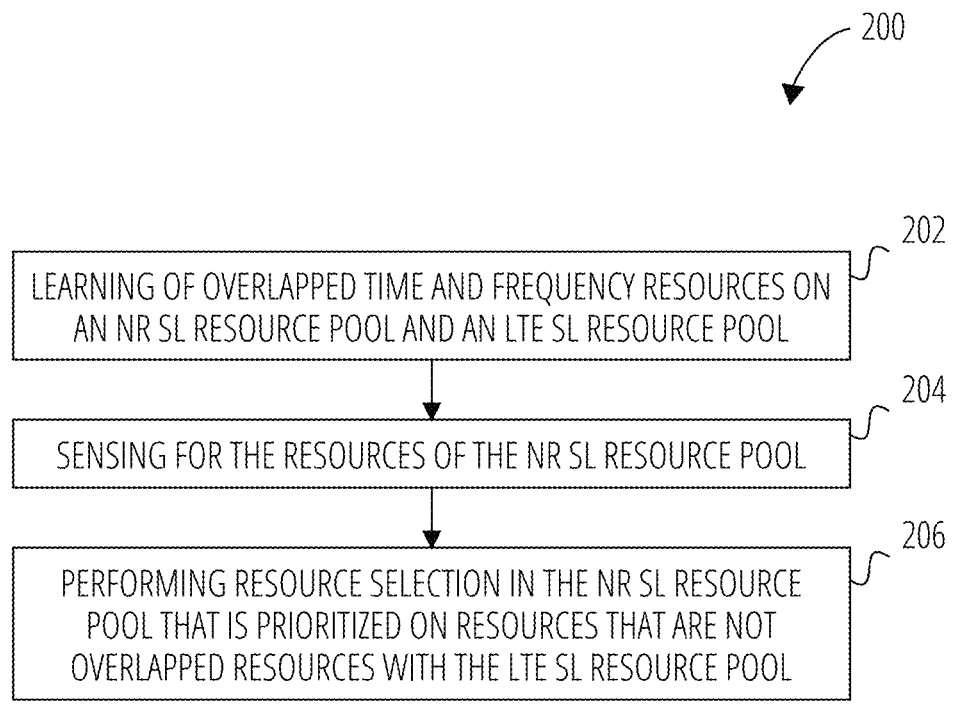
FIG. 2 illustrates a method of a UE for performing NR SL in a Mode 2 resource allocation scheme, wherein the method accounts for impacts of an overlap of the corresponding NR SL resource pool with an LTE SL resource pool, according to an embodiment.

FIG. 2 illustrates a method 200 of a UE for performing NR SL in a Mode 2 resource allocation scheme, wherein the method accounts for impacts of an overlap of the corresponding NR SL resource pool with an LTE SL resource pool, according to an embodiment. The UE may be, for example, an NR UE that is capable of performing SL on an NR RAT using the NR SL resource pool.

The method 200 includes learning of overlapped time and frequency resources on the NR SL resource pool and an LTE SL resource pool. For example, configuration information for the NR SL resource pool that is provided to the UE and/or pre-configured to the UE may indicate the location(s) of the overlapped portion(s) of the NR SL resource pool and/or the LTE SL resource pool. Alternatively, the UE may be provided and/or be pre-configured with configuration information for each of the NR SL resource pool and the LTE SL resource pool, and may use this information to itself determine the location(s) of the overlapped portion(s) of the NR resource pool and/or the LTE SL resource pool. Accordingly, the UE may be aware that there is a chance of collision between transmissions on overlapped resources from the SL resource pool for each RAT, as described above.

The method 200 further includes sensing 204 for the resources of the NR SL resource pool. This includes sensing for, for example, the overlapped resources within the NR SL resource pool. The sensing 204 may include sensing for SCI sent by a peer UE that include reservation(s) of one or more of the resources of the NR SL resource pool that are being considered for selection as candidate resources, in the manner described in relation to FIG. 1.

The method 200 further includes performing 206 the resource selection in the NR resource pool that is prioritized on resources that are not overlapped with the LTE SL resource pool. As part of the prioritization, the selection method used to select the resources may ultimately select resources from the portion of the NR resource pool that does not overlap with the LTE SL resource pool with a higher probability than resources from the portion of the NR resource pool that does overlap with the LTE SL resource pool. Alternatively or additionally, the resource selection method used to select the resources may, as part of the prioritization, ensure the selection method used selects a minimum or floor amount of resources from the portion of the NR SL resource pool that does not overlap with the LTE SL resource pool. Alternatively or additionally, the resource selection method used to select the resources may, as part of the prioritization, only select resource from the portion of the NR resource pool that does not overlap with the LTE SL resource pool. Examples of methods that result in these (and other types of) prioritizations are described herein.

Figure 3:
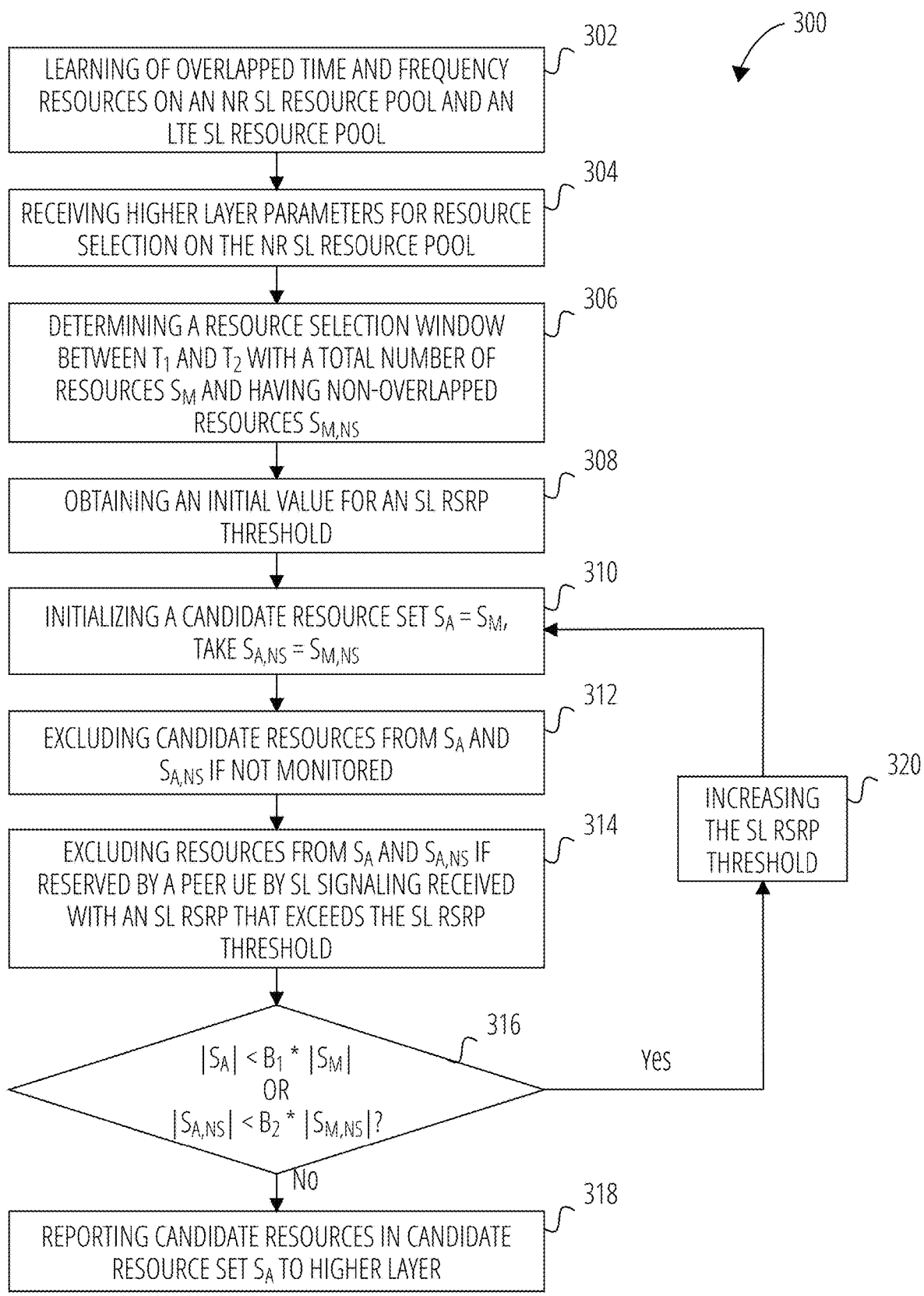
FIG. 3 illustrates a method of a UE for performing NR SL in a Mode 2 resource allocation scheme that prioritizes resource selection in a portion of an NR SL resource pool that is not overlapped with an LTE SL resource pool, according to an embodiment.

FIG. 3 illustrates a method 300 of a UE for performing NR SL in a Mode 2 resource allocation scheme that prioritizes resource selection in a portion of an NR SL resource pool that is not overlapped with an LTE SL resource pool, according to an embodiment. The method 300 includes learning 302 of overlapped time and frequency resources on an NR SL resource pool and an LTE SL resource pool. This may occur as described previously.

The method 300 further includes receiving 304 higher layer parameters for resource selection on the NR SL resource pool. These higher layer parameters may include a beginning time for a resource selection window ($T_1$), an end time for a resource selection window ($T_2$), etc.

The method 300 further includes determining 306 a resource selection window between $T_1$ and $T_2$ with a total number of resources $S_M$ and having non-overlapped resources $S_{M,NS}$. This may be done as described previously (note that the determination of resources $S_{M,NS}$ should be understood as being driven by the determination of resources $S_M$).

The method 300 further includes obtaining 308 an initial value for an SL RSRP threshold. This may occur as described previously.

The method 300 further includes initializing 310 a candidate resource set $S_A=S_M$, and taking $S_{A,NS}=S_{M,NS}$. Once so initialized, $S_A$ begins with all of the resources in the selection window as (tentative) candidate resources, and $S_{A,NS}$ begins with the resources of the selection window that are not overlapped with resources of the LTE SL resource pool.

The method 300 further includes excluding 312 any resources from $S_A$ and $S_{A,NS}$ if those resources have not been monitored for. This may occur as described previously.

The method 300 further includes excluding 314 resources from $S_A$ and $S_{A,NS}$ if reserved by a peer UE by SL signaling received with an SL RSRP that exceeds (or is equal to or exceeds) an RSRP threshold. This may occur as described previously.

The method 300 further includes determining 316 whether $|S_A|<B_1*|S_M|$ or $|S_{A,NS}|<B_2*|S_{M,NS}|$, where:

$|S_A|$ is the number of resources that remain in $S_A$ (the number of remaining (tentative) candidate resources);

$B_1$ is a ratio between 0 and 1;

$|S_M|$ is the number of resources in $S_M$ (the total number of resources in the resource selection window);

$|S_{A,NS}|$ is the number of resources that remain in $S_{A,NS}$ (the number of remaining (tentative) candidate resources that are not overlapped with the LTE SL resource pool);

$B_2$ is a second ratio between 0 and 1; and $|S_{M,NS}|$ is the number of resources in $S_{M,NS}$ (the total number of resources in the resource selection window that are not overlapped with the LTE SL resource pool).

In other words, the determining 316 is used to determine whether or not at least a given percentage (corresponding to the ratio $B_1$) of the resources $S_M$ defined by the resource selection window remain (tentative) candidate resources of $S_A$ after the excluding 108 and the excluding 110 are performed on $S_A$, and whether or not at least a given percentage (corresponding to the ratio $B_2$) of the resources in $S_M$ that do not overlap the LTE SL resource pool ($S_{A,NS}$) remain in $S_A$ relative to the total of all resources of $S_M$ that do not overlap the LTE SL resource pool ($S_{M,NS}$).

A restriction on the values of $B_1$ and $B_2$ in the form of $B_2 \geq B_1$ may be applied to the uses of the corresponding formulas as described. This restriction may mean that a larger percentage of non-overlapped resources from the resource selection window must remain in $S_A$ as compared to the percentage of all resources remaining in $S_A$ from the resource selection window (thereby ensuring that a larger percentage of non-overlapped resources from the resource selection window remain in $S_A$ than a percentage of overlapped resources from the resource selection window that remain in $S_A$).

The ratio $B_1$ may be configured or pre-configured to the UE (e.g., in configuration information for the NR SL resource pool). In some embodiments, it is contemplated that the ratio $B_1$ could be, for example, 0.20, 0.35, 0.50, etc.

The ratio $B_2$ may be configured or pre-configured to the UE (e.g., in configuration information for the NR SL resource pool).

If $|S_A|$ is less than (or less than or equal to) the value of $B_1 * |S_M|$, then the UE determines that there are too few resources left in the candidate resource set $S_A$. Alternatively, if $|S_{A,NS}|$ is less than (or less than or equal to) the value of $B_2 * |S_{M,NS}|$, the UE determines that there are too few resources left in the portion of the candidate resource set that does not overlap with the LTE SL resource pool $S_{A,NS}$. Should either of these determinations be made, the UE proceeds to increasing 320 the RSRP threshold and then proceeding with the initializing 310 through the determining 316 again. The effect of the increased RSRP threshold is to (potentially) cause, during the subsequent re-performance of the initializing 310 through the determining 316, fewer resources are removed from $S_A$ and/or $S_{A,NS}$ during the excluding 110 thereby (potentially) changing the result of the determining 316.

After zero or more such loops back to the initializing 310, once the determining 316 finds that the value of $|S_M|$ is greater than or equal to (or greater than) the value of $B_1 * |S_M|$ and that the value of $|S_{A,NS}|$ is greater than or equal to than (or greater than) the value of $B_2 * |S_{M,NS}|$ the UE determines that there are sufficient resources left in the candidate resource set $S_A$ and $S_{A,NS}$ for use by higher layers of the UE. Accordingly, the resources in $S_A$ are considered at this juncture candidate resources (rather than tentative candidate resources).

The UE accordingly proceeds to reporting 318 candidate resources in the candidate resource set $S_A$ to the higher layer. In some cases, the UE reports the first $|B_1 * |S_M||$ candidate resources in the set $S_A$ to the higher layer. Note that because $|B_1 * |S_M||$ may be smaller than $|S_A|$, it is possible that by reporting $|B_1 * |S_M||$ resources of $S_A$, a higher percentage of candidate resources that are not overlapped are reported than in the case of reporting all the resources in $S_A$. In alternative embodiments, the UE may instead report the first $B_2 * |S_{M,NS}|$ candidate resources in the set $S_{A,NS}$, and then report additional candidate resources from the remainder of the set $S_A$ (until an amount of resources equal to $B_1 * |S_M|$ is reached) to the higher layer. Then, one or more of those reported candidate resources (e.g., one to three of those reported candidate resources) are then selected by the UE and are used as transmission resources to transmit on the SL.

Accordingly, one overall effect of using the method 300 may be to ensure that a minimum number of resources in a selection window for the NR SL resource pool that do not overlap with the LTE SL resource pool (as determined relative to the an overall number of non-overlapped resources in the selection window, as described above) are included in candidate resources used by the UE to select transmission resources.

Figure 4:
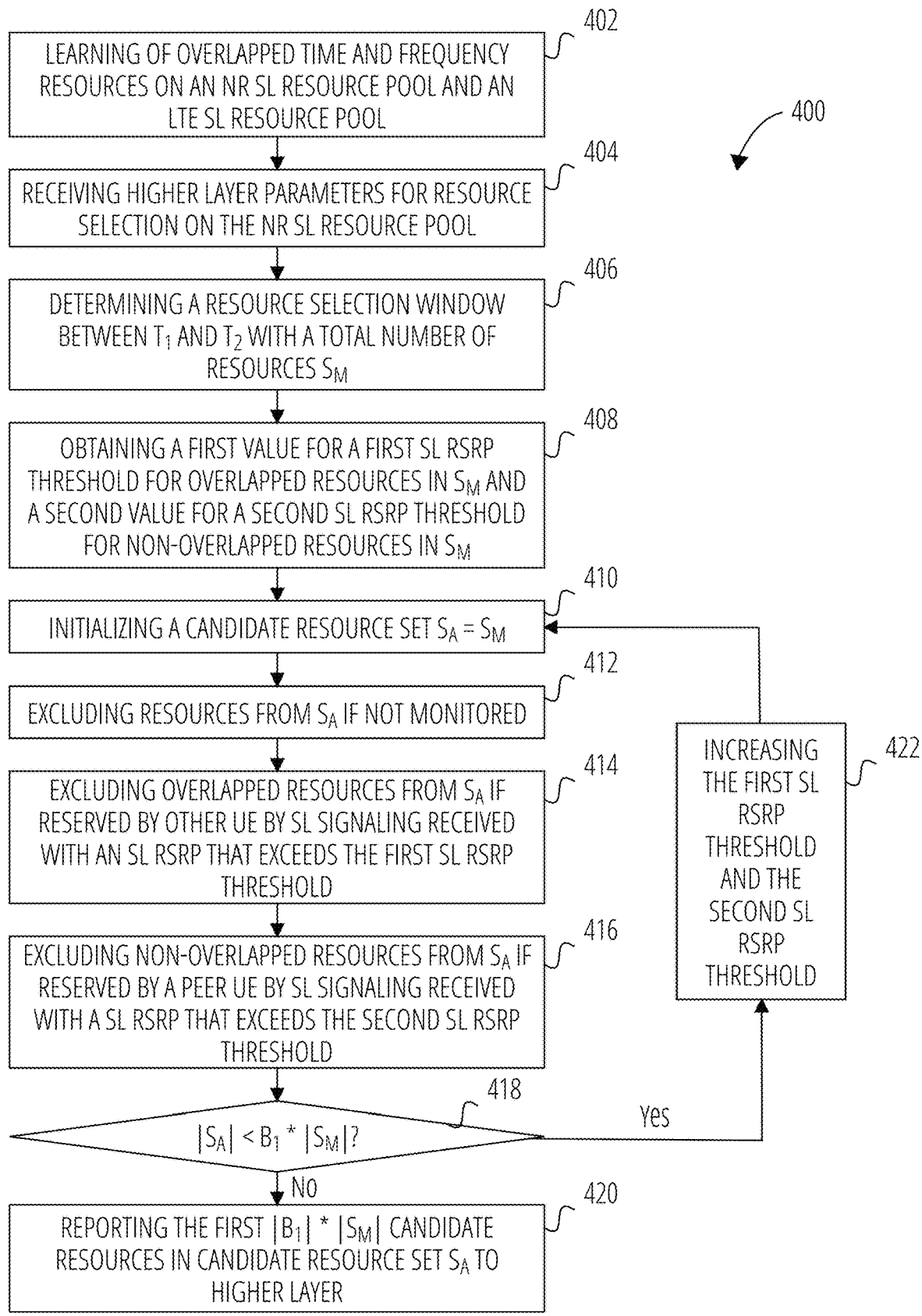
FIG. 4 illustrates a method of a UE for performing NR SL in a Mode 2 resource allocation scheme that prioritizes resource selection in a portion of an NR SL resource pool that is not overlapped with an LTE SL resource pool, according to an embodiment.

FIG. 4 illustrates a method 400 of a UE for performing NR SL in a Mode 2 resource allocation scheme that prioritizes resource selection in a portion of an NR SL resource pool that is not overlapped with an LTE SL resource pool, according to an embodiment. The method 400 includes learning 402 of overlapped time and frequency resources on an NR SL resource pool and an LTE SL resource pool. This may occur as described previously.

The method 400 further includes receiving 404 higher layer parameters for resource selection on the NR SL resource pool. These higher layer parameters may include a beginning time for a resource selection window ($T_1$), an end time for a resource selection window ($T_2$), etc.

The method 400 further includes determining 406 a resource selection window with a total number of resources $S_M$. This may be done as described previously.

The method 400 further includes obtaining 408 a first value for a first SL RSRP threshold for overlapped resources in $S_M$ and a second value for a second SL RSRP threshold for non-overlapped resources in $S_M$ (e.g., from a network corresponding to the NR RAT, or according to a pre-configuration at the UE). It may be that the value for the first SL RSRP threshold (for overlapped resources in $S_M$) is lower than the value for the second SL RSRP threshold (for non-overlapped resources in $S_M$).

The method 400 further includes initializing 410 a candidate resource set $S_A = S_M$. Once so initialized, $S_A$ begins with all of the resources in the selection window as (tentative) candidate resources.

The method 400 further includes excluding 412 any resources from $S_A$ if they have not been monitored for. This may occur as described previously.

The method 400 further includes excluding 414 overlapped resources from $S_A$ if reserved by a peer UE by SL signaling received with an SL RSRP that exceeds (or is equal to or exceeds) the first SL RSRP threshold. This may occur by monitoring for SCI corresponding to a given resource in $S_A$ sent by a peer UE, and then measuring an SL RSRP of a transmission by the peer UE in the slot of the SCI (as described previously). Then, for resources of $S_A$ that are overlapped with the LTE SL resource pool, measured SL RSRP may be compared to the first SL RSRP threshold to see if it exceeds (or equals or exceeds) the first SL RSRP threshold.

The method 400 further includes excluding 416 non-overlapped resources from $S_A$ if reserved by a peer UE by SL signaling received with an SL RSRP that exceeds (or is equal to or exceeds) the second SL RSRP threshold. This may occur by monitoring for SCI corresponding to a given resource in $S_A$ sent by a peer UE, and then measuring an SL RSRP of a transmission by the peer UE in the slot of the SCI (as described previously). Then, for resources of $S_A$ that are not overlapped with the LTE SL resource pool, measured SL RSRP may be compared to the second SL RSRP threshold to see if it exceeds (or equals or exceeds) the second SL RSRP threshold.

Because the first SL RSRP threshold is lower than the value for the second SL RSRP threshold, the UE excludes overlapped resources on a more strict basis than for non-overlapped resources (e.g., the UE is more permissively keeps non-overlapped resources in the candidate resource set $S_A$). Accordingly, the likelihood that a non-overlapped resource is not excluded from (is kept in) the candidate resource set is generally higher than a likelihood that an overlapped resource is not excluded from (is kept in) the candidate resource set (assuming a relatively equal distribution of received SL RSRPs corresponding to SCI scheduling overlapped resources versus non-overlapped resources).

The method 400 further includes determining 418 whether $|S_A|<B_1*|S_M|$ where:

$|S_A|$ is the number of resources that remain in $S_A$ (the number of remaining (tentative) candidate resources);

$B_1$ is a ratio between 0 and 1; and $|S_M|$ is the number of resources in $S_M$ (the total number of resources in the resource selection window).

In other words, the determining 112 is used to determine whether or not at least a given percentage (corresponding to the ratio $B_1$) of the resources defined by the resource selection window remain (tentative) candidate resources of $S_A$ after the excluding 108 and the excluding 110 are performed on $S_A$.

The ratio $B_1$ may be configured or pre-configured to the UE (e.g., in configuration information for the NR SL resource pool). In some embodiments, it is contemplated that the ratio $B_1$ could be, for example, 0.20, 0.35, 0.50, etc.

If $|S_A|$ is less than (or less than or equal to) the value of $B_1*|S_A|$ then the UE determines that there are too few resources left in the candidate resource set $S_A$. Accordingly, the UE proceeds to increasing 422 the first RSRP threshold and the second RSRP threshold, and then proceeding with the initializing 410 through the determining 418 again. The effect of the increased RSRP thresholds is to (potentially) cause, during the subsequent re-performance of the initializing 410 through the determining 418, fewer resources are removed from $S_A$ during the excluding 414 and the excluding 416, thereby (potentially) changing the result of the determining 418.

During the increasing 422, it may be that some UE increase the first RSRP threshold (for overlapped resources) by a lesser amount by an increase made to the second RSRP threshold (for non-overlapped resources). This bigger increase on the second threshold causes the application of the second threshold to reservations for non-overlapped resources during the excluding 416 to become even more relatively permissive than the application of the first threshold to reservations for overlapped resources during the excluding 416. This increases the relative likelihood that a greater proportion of the non-excluded resources in $S_A$ after the excluding 414 and the excluding 416 are performed are not overlapped by the LTE SL resource pool.

After zero or more such loops back to the initializing 106, once the determining 112 finds that the value of $|S_A|$ is greater than or equal to (or greater than) the value of $B_1*|S_M|$, the UE determines that there are sufficient resources left in the candidate resource set $S_A$ for use by higher layers of the UE. Accordingly, the resources in $S_A$ are considered at this juncture candidate resources (rather than tentative candidate resources).

The UE accordingly proceeds to reporting 420 the first $|B_1|*|S_M|$ candidate resources in the candidate resource set $S_A$ to the higher layer. Note that because $|B_1|*|S_M|$ may be smaller than $|S_A|$, it is possible that by reporting $|B_1|*|S_M|$ resources of $S_A$, a higher percentage of candidate resources that are not overlapped are reported than in the case of reporting all the resources in $S_A$. Then, one or more of those reported candidate resources (e.g., one to three of those reported candidate resources) are selected from those resources by the UE and are used as transmission resources to transmit on the SL.

Accordingly, one overall effect of using the method 400 may be to cause resources in a selection window for the NR SL resource pool that do not overlap with the LTE SL resource pool (as determined relative to the an overall number of non-overlapped resources in the selection window, as described above) to be more likely (relative to, e.g., embodiments according to the method 100 of FIG. 1) to be included in candidate resources used by the UE to select transmission resources.

Figure 5:
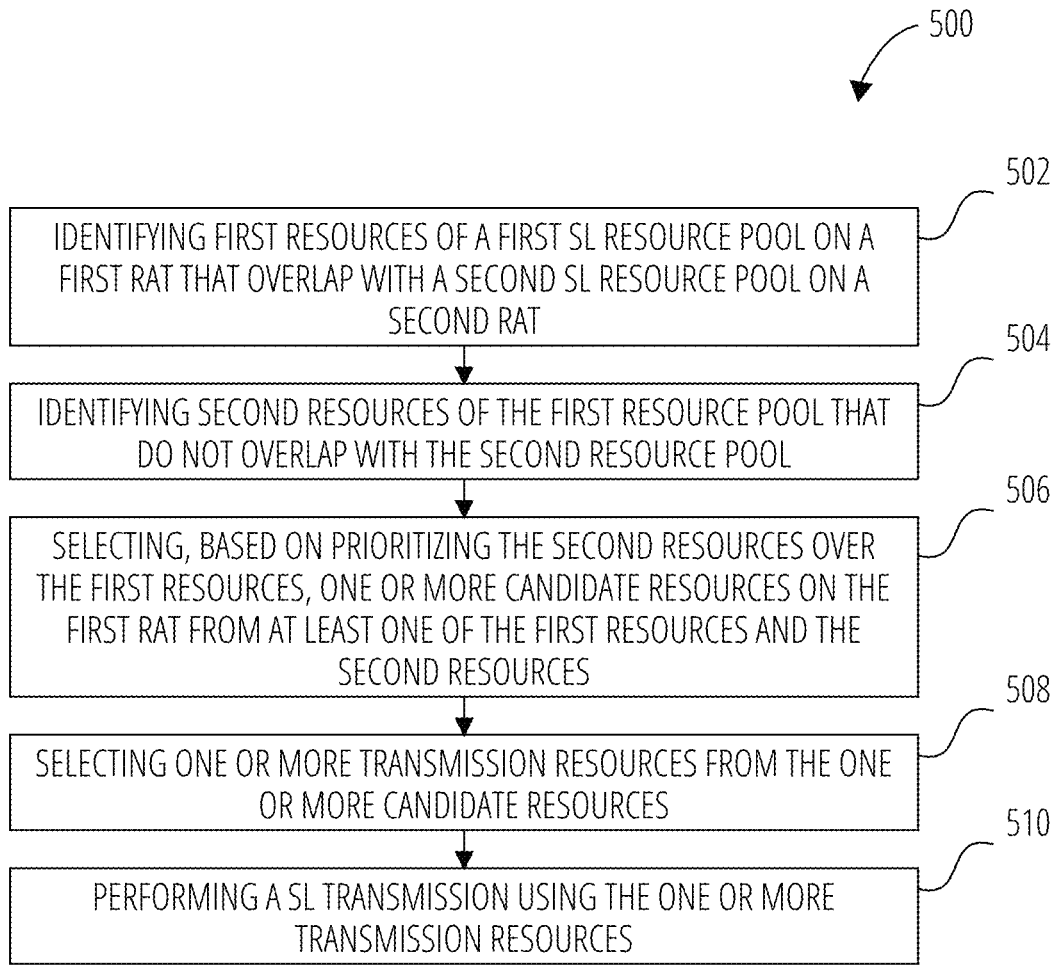
FIG. 5 illustrates a method of a UE, according to an embodiment.

FIG. 5 illustrates a method 500 of a UE, according to an embodiment. The method 500 includes identifying 502 first resources of a first SL resource pool on a first RAT that overlap with a second SL resource pool on a second RAT.

The method 500 further includes identifying 504 second resources of the first resource pool that do not overlap with the second resource pool.

The method 500 further includes selecting 506, based on prioritizing the second resources over the first resources, one or more candidate resources on the first RAT from at least one of the first resources and the second resources.

The method 500 further includes selecting 508 one or more transmission resources from the one or more candidate resources.

The method 500 further includes performing 510 a SL transmission using the one or more transmission resources.

In some embodiments of the method 500, the one or more candidate resources are selected within a selection window of the first resource pool, and the UE prioritizes the second resources during the selecting by determining an amount of the second resources within the selection window; calculating a threshold amount of the second resources based on the amount of the second resources within the selection window; determining an amount of the second resources within the one or more candidate resources; and determining that the amount of the second resources within the one or more candidate resources reaches the threshold amount.

In some embodiments of the method 500, the selecting, based on prioritizing the second resources over the first resources, the one or more candidate resources comprises using a first SL RSRP threshold when selecting for the one or more candidate resources from the first resources; and using a second SL RSRP threshold that is larger than the first SL RSRP threshold when selecting for the one or more candidate resources from the second resources.

In some embodiments of the method 500, the selecting, based on prioritizing the second resources over the first resources, the one or more candidate resources comprises increasing a first SL RSRP threshold used when selecting for the one or more candidate resources from the first resources by a first amount; and increasing a second SL RSRP threshold used when selecting for the one or more candidate resources from the second resources by a second amount that is larger than the first amount.

Embodiments contemplated herein include an apparatus comprising means to perform one or more elements of the method 500. This apparatus may be, for example, an apparatus of a UE (such as a first wireless device 1602 that is a UE, as described herein).

Embodiments contemplated herein include one or more non-transitory computer-readable media comprising instructions to cause an electronic device, upon execution of the instructions by one or more processors of the electronic device, to perform one or more elements of the method 500. This non-transitory computer-readable media may be, for example, a memory of a UE (such as a memory 1606 of a first wireless device 1602 that is a UE, as described herein).

Embodiments contemplated herein include an apparatus comprising logic, modules, or circuitry to perform one or more elements of the method 500. This apparatus may be, for example, an apparatus of a UE (such as a first wireless device 1602 that is a UE, as described herein).

Embodiments contemplated herein include an apparatus comprising: one or more processors and one or more computer-readable media comprising instructions that, when executed by the one or more processors, cause the one or more processors to perform one or more elements of the method 500. This apparatus may be, for example, an apparatus of a UE (such as a first wireless device 1602 that is a UE, as described herein).

Embodiments contemplated herein include a signal as described in or related to one or more elements of the method 500.

Embodiments contemplated herein include a computer program or computer program product comprising instructions, wherein execution of the program by a processor is to cause the processor to carry out one or more elements of the method 500. The processor may be a processor of a UE (such as a processor(s) 1604 of a first wireless device 1602 that is a UE, as described herein). These instructions may be, for example, located in the processor and/or on a memory of the UE (such as a memory 1606 of a first wireless device 1602 that is a UE, as described herein).

In some cases, a UE may perform an NR SL in a Mode 2 resource allocation scheme that does not perform sensing for SCI corresponding to the resources in a selection window of the NR SL resource pool in order to check for reserved resources of the selection window. Rather, such a UE may consider all of the resources within a selection window as selectable candidate resources, and then accordingly randomly select resources within the selection window to use as transmission resources. In such cases, as part of prioritizing the selection of transmission resources that do not overlap with the LTE SL resource pool, in order to ultimately avoid collision(s) with resources used for transmission on any LTE SL resource pool that is overlapped with the NR SL resource pool, it may be that the UE randomly selects only resources that occur in the NR SL resource pool (in the selection window) that do not overlap with the LTE SL resource pool from the selection window as transmission resources.

In some cases, once a set of candidate resources has been identified at the UE (in whatever fashion, e.g., using sensing for SCI corresponding to selection window resources to narrow a set of candidate resources, or when simply using the entire selection window as candidate resources), if multiple transmission resources are to be selected from the candidate resources for the transmission of a single transport block, the UE may ensure that at least one of the transmission resources is selected from the candidate resources that do not overlap with the LTE SL resource pool.

In some cases, various sets of other criteria may be used to prioritize the selection of non-overlapped resources.

Figure 6:
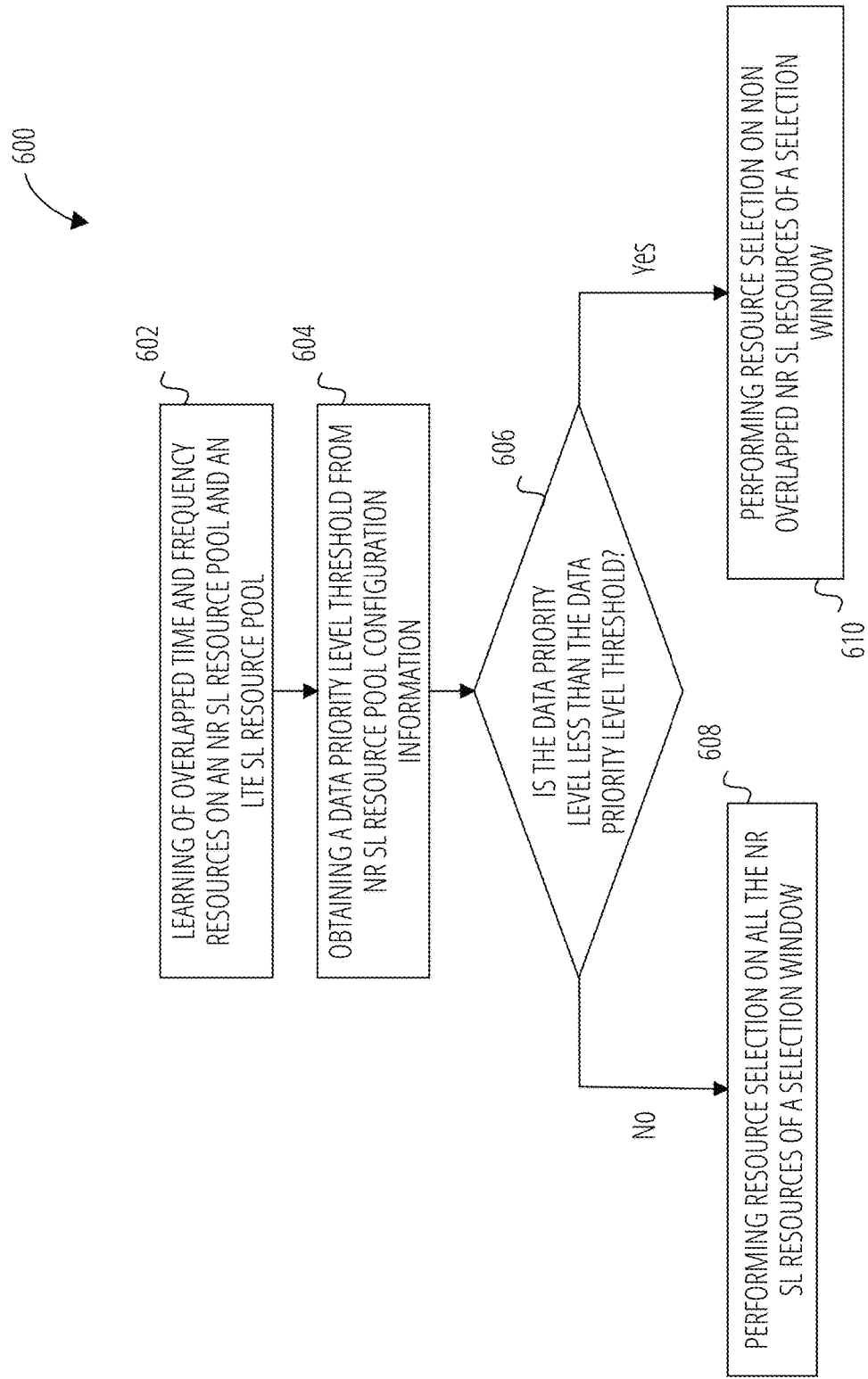
FIG. 6 illustrates a method of a UE for determining whether to perform NR SL in a Mode 2 resource allocation scheme that prioritizes resource selection in a portion of an NR SL resource pool that is not overlapped with an LTE SL resource pool, according to an embodiment.

FIG. 6 illustrates a method 600 of a UE for determining whether to perform NR SL in a Mode 2 resource allocation scheme that prioritizes resource selection in a portion of an NR SL resource pool that is not overlapped with an LTE SL resource pool, according to an embodiment. The method 600 includes learning 602 of overlapped time and frequency resources on an NR SL resource pool and an LTE SL resource pool. This may occur as described previously.

The method 600 further includes obtaining 604 a data priority level threshold from NR SL resource pool configuration information. It may be that a resource pool configuration for the NR SL that is known (e.g., either configured or pre-configured) to the UE may include such a data priority level threshold. The data priority level threshold may be understood to be for use with a corresponding NR SL resource pool (e.g., the NR SL resource pool corresponding to the resource pool configuration having the data priority level threshold).

The method 600 further includes determining 606 whether the data priority level (of data to be sent using SL) is less than (or less than or equal to) the data priority threshold.

If the UE determines that the data priority level is not less than (or less than or equal to) the data priority threshold, then the method 600 proceeds to performing 608 resource selection on all the NR SL resources of a selection window. For example, the UE may select transmission resources from all candidate resources that were previously determined from a selection window of the NR SL resource pool, regardless of any overlap with an LTE SL resource pool.

If the UE determines that the data priority level is greater than or equal to (or greater than) the data priority threshold, then the method 600 proceeds to performing 610 resource selection on only NR SL resources of a selection window that are not overlapped with the LTE SL resource pool. For example, the UE may select transmission resources only from candidate resources (that were previously determined from a selection window of the NR SL resource pool) that do not overlap with an LTE SL resource pool. In some of these cases, the UE may also (e.g., also in response to the determining 606) preliminarily identify the candidate resources using methods that prioritize resources that do not overlap with an LTE SL resource pool, as previously described herein.

Accordingly, it may be said that this prioritization behavior accounts for the relatively high priority of the data to be transmitted (e.g., in the case that lower priority levels correspond to higher priorities) by making it relatively more likely that the transmission of the data will be successful (by removing the possibility of collision with a transmission on the LTE SL resource pool when transmitting the data).

Figure 7:
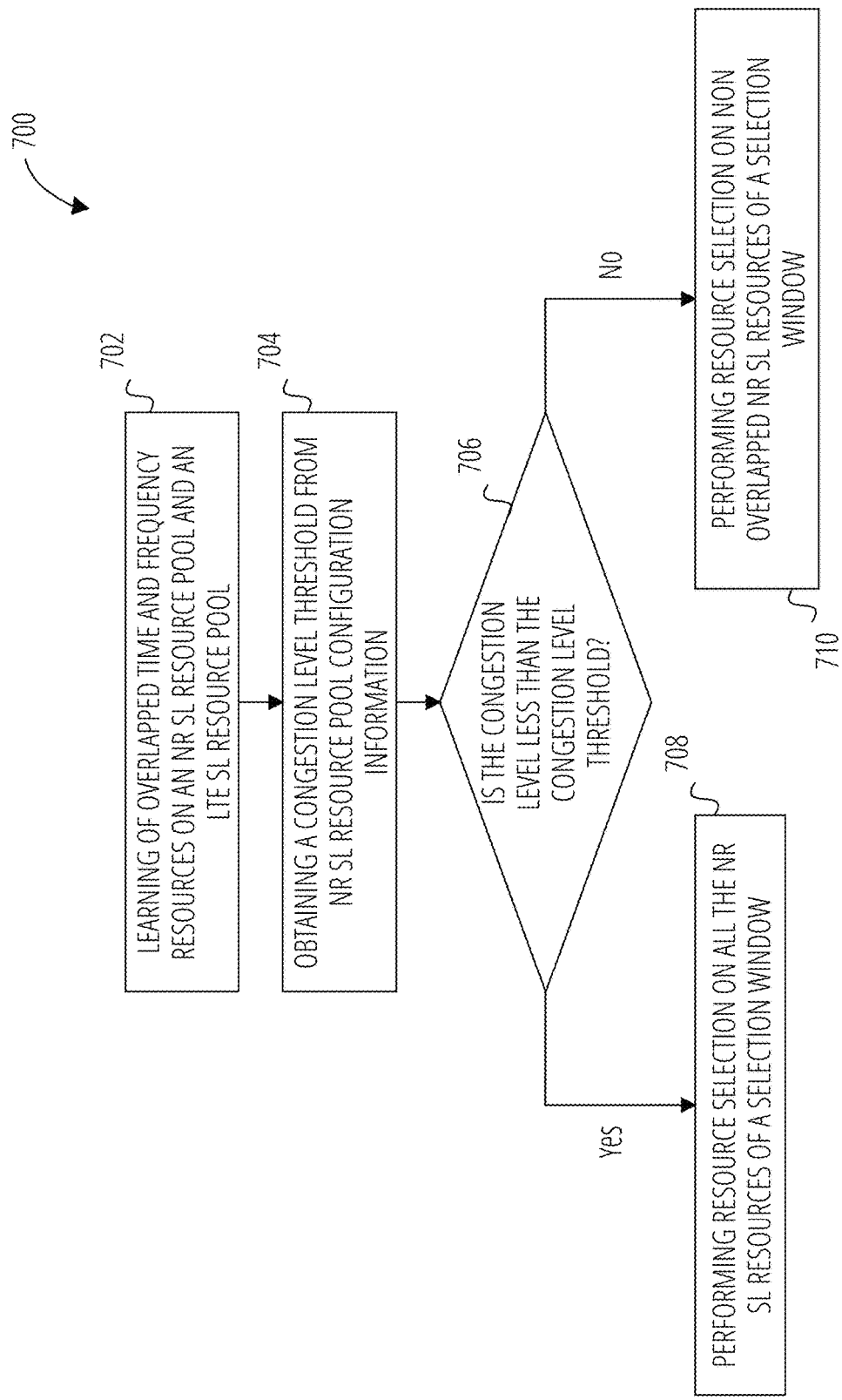
FIG. 7 illustrates a method of a UE for determining whether to perform NR SL in a Mode 2 resource allocation scheme that prioritizes resource selection in a portion of an NR SL resource pool that is not overlapped with an LTE SL resource pool, according to an embodiment.

FIG. 7 illustrates a method 700 of a UE for determining whether to perform NR SL in a Mode 2 resource allocation scheme that prioritizes resource selection in a portion of an NR SL resource pool that is not overlapped with an LTE SL resource pool, according to an embodiment. The method 700 includes learning 702 of overlapped time and frequency resources on an NR SL resource pool and an LTE SL resource pool. This may occur as described previously.

The method 700 further includes obtaining 704 a congestion level threshold from NR SL resource pool configuration information. It may be that a resource pool configuration for the NR SL that is known (e.g., either configured or pre-configured) to the UE may include such a congestion level threshold. The congestion level threshold may be understood to be for use with a corresponding NR SL resource pool (e.g., the NR SL resource pool corresponding to the resource pool configuration having the congestion level threshold). The congestion level threshold may be, for example, a channel busy ratio (CBR) threshold.

The method 700 further includes determining 706 whether a congestion level (of the NR SL resource pool) is less than (or less than or equal to) the congestion threshold. The congestion level of the NT SL resource pool may be represented by a CBR determined relative to the NR SL resource pool. In some embodiments, this CBR is measured/determined relative to the entire NR SL resource pool. In other embodiments, this CBR is measured/determined relative to only the portion of the NR SL resource pool that overlaps with the LTE SL resource pool.

If the UE determines that the congestion level is less than (or less than or equal to) the congestion level threshold, then the method 700 proceeds to performing 708 resource selection on all the NR SL resources of a selection window. For example, the UE may select transmission resources from all candidate resources that were previously determined from a selection window of the NR SL resource pool, regardless of any overlap with an LTE SL resource pool.

If the UE determines that the congestion level is greater than or equal to (or greater than) the congestion threshold, then the method 700 proceeds to performing 708 resource selection on only NR SL resources of a selection window that are not overlapped with the LTE SL resource pool. For example, the UE may select transmission resources only from candidate resources (that were previously determined from a selection window of the NR SL resource pool) that do not overlap with an LTE SL resource pool. In some of these cases, the UE may also (e.g., also in response to the determining 706) preliminarily identify the candidate resources using methods that prioritize resources that do not overlap with an LTE SL resource pool, as previously described herein.

Accordingly, it may be said that this prioritization behavior acts to improve the probability of a successful transmission in view of high congestion levels on the NR SL resource pool by removing the possibility of collision with a transmission on the LTE SL resource pool when transmitting the data.

Figure 8:
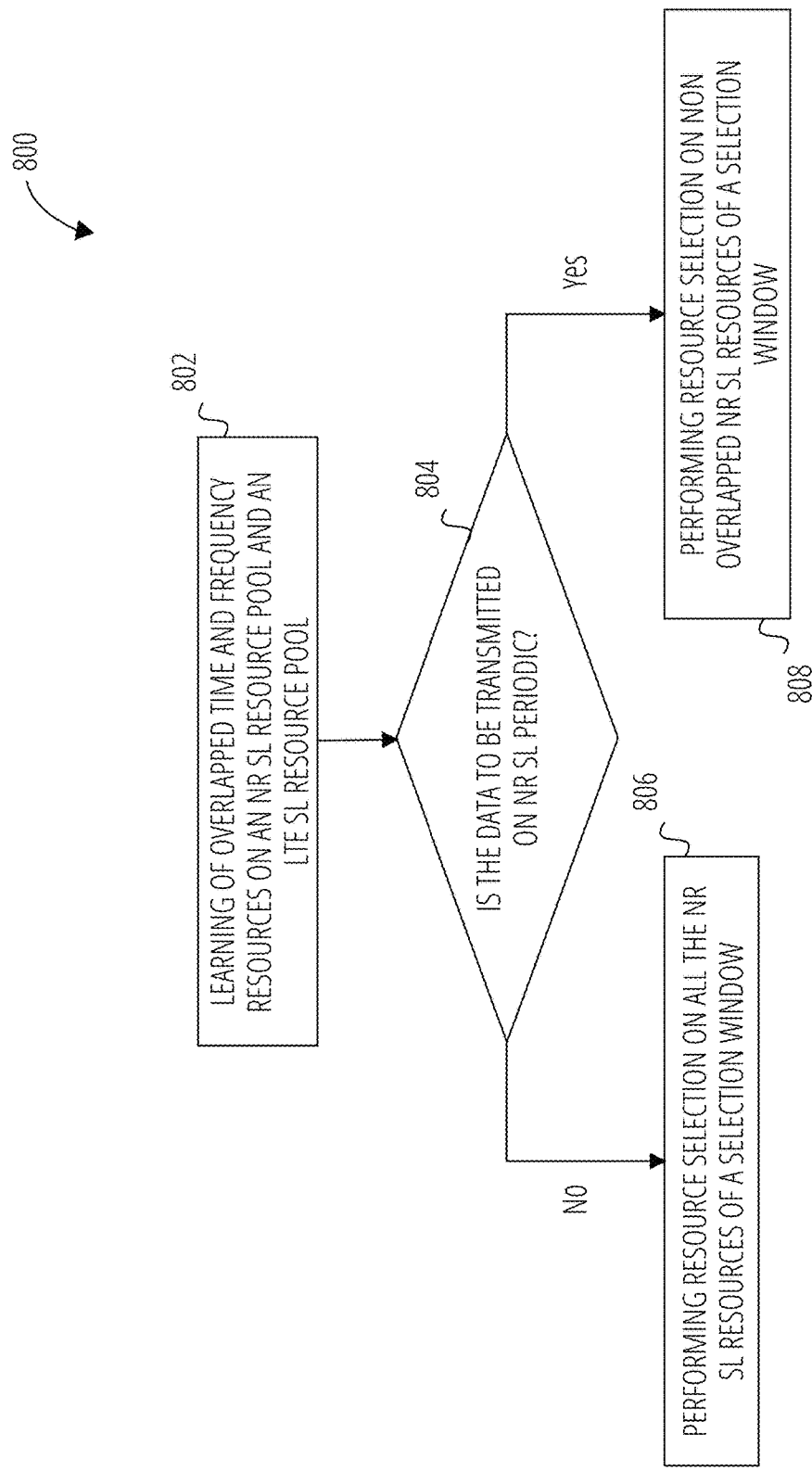
FIG. 8 illustrates a method of a UE for determining whether to perform NR SL in a Mode 2 resource allocation scheme that prioritizes resource selection in a portion of an NR SL resource pool that is not overlapped with an LTE SL resource pool, according to an embodiment.

FIG. 8 illustrates a method 800 of a UE for determining whether to perform NR SL in a Mode 2 resource allocation scheme that prioritizes resource selection in a portion of an NR SL resource pool that is not overlapped with an LTE SL resource pool, according to an embodiment. The method 800 includes learning 802 of overlapped time and frequency resources on an NR SL resource pool and an LTE SL resource pool. This may occur as described previously.

The method 800 further includes determining 804 whether the data to be transmitted on NR SL is periodic in nature.

If the UE determines that the data to be transmitted on NR SL is not periodic in nature, then the method 800 proceeds to performing 806 resource selection on all the NR SL resources of a selection window. For example, the UE may select transmission resources from all candidate resources that were previously determined from a selection window of the NR SL resource pool, regardless of any overlap with an LTE SL resource pool.

If the UE determines that the data to be transmitted is periodic in nature, then the method 800 proceeds to performing 808 resource selection on only NR SL resources of a selection window that are not overlapped with the LTE SL resource pool. For example, the UE may select transmission resources only from candidate resources (that were previously determined from a selection window of the NR SL resource pool) that do not overlap with an LTE SL resource pool. In some of these cases, the UE may also (e.g., also in response to the determining 804) preliminarily identify the candidate resources using methods that prioritize resources that do not overlap with an LTE SL resource pool, as previously described herein.

Accordingly, it may be said that this prioritization behavior acts to improve the probability of successful transmissions that are periodic in nature (and therefore have a relatively larger exposure to collision generally than, e.g., aperiodic transmissions) by removing the possibility of collision with a transmission on the LTE SL resource pool when transmitting such periodic data.

It is contemplated that combinations of the use of multiple criteria may be used. For example, a UE may consider one, two, or all of the data priority criteria, the congestion criteria, and the periodic data criteria simultaneously. Further, the UE may limit its resource selection to only non-overlapped NR SL resources of a selection window in the case that, for example, any one, two, or all of these results in a determination that the resource selection should be so limited.

Figure 9:
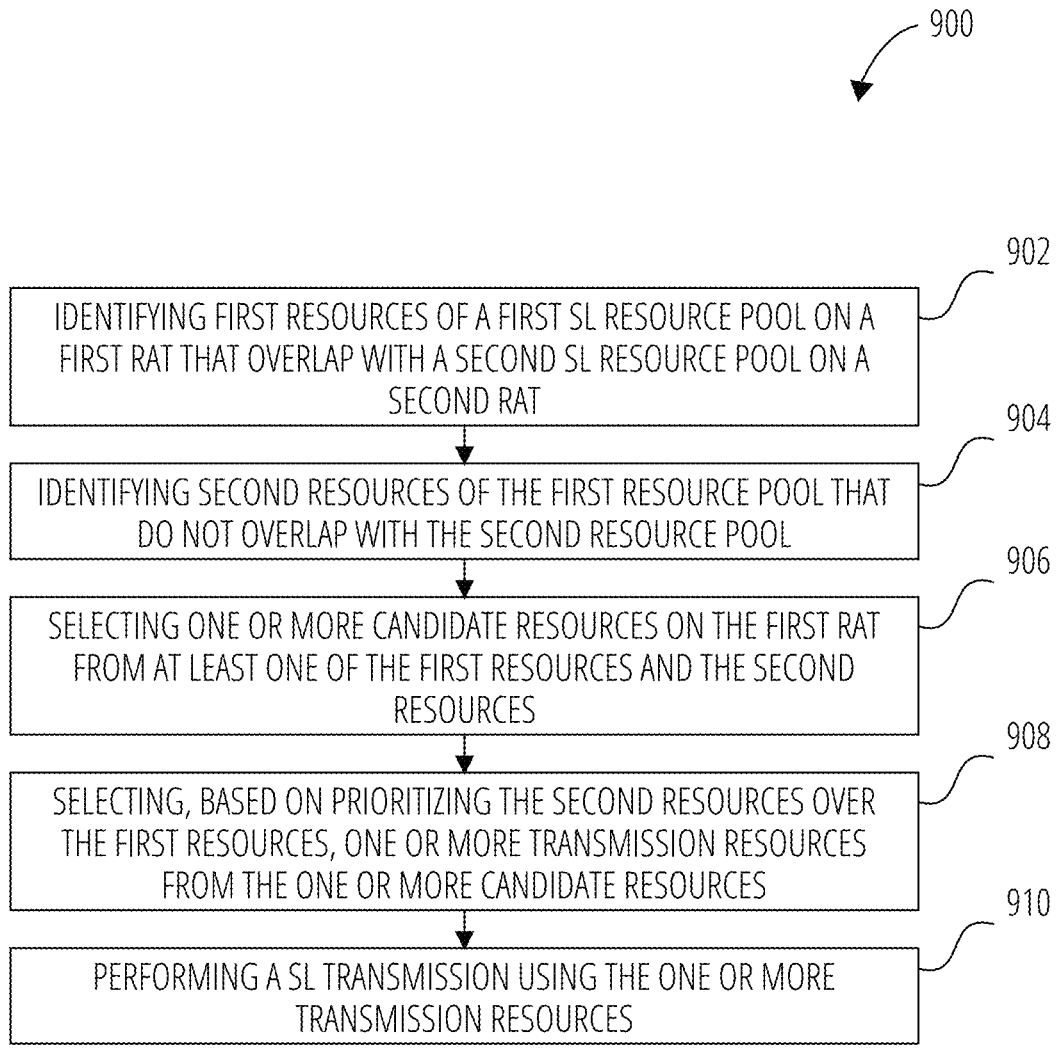
FIG. 9 illustrates a method of a UE, according to an embodiment.

FIG. 9 illustrates a method 900 of a UE, according to an embodiment. The method 900 includes identifying 902 first resources of a first SL resource pool on a first RAT that overlap with a second SL resource pool on a second RAT.

The method 900 further includes identifying 904 second resources of the first resource pool that do not overlap with the second resource pool.

The method 900 further includes selecting 906 one or more candidate resources on the first RAT from at least one of the first resources and the second resources.

The method 900 further includes selecting 908, based on prioritizing the second resources over the first resources, one or more transmission resources from the one or more candidate resources.

The method 900 further includes performing 910 a SL transmission using the one or more transmission resources.

In some embodiments of the method 900, when the UE does not check for reserved resources when selecting the candidate resources, the selecting, based on prioritizing the second resources over the first resources, the one or more transmission resources comprises selecting for the one or more transmission resources from only the candidate resources selected from the second resources.

In some embodiments of the method 900, when the SL transmission uses multiple of the one or more transmission resources to transmit a TB, the selecting, based on prioritizing the second resources over the first resources, the one or more transmission resources comprises selecting at least one of the multiple of the one or more transmission resources from candidate resources selected from the second resources.

In some embodiments of the method 900, when a priority level of data sent on the SL transmission meets a threshold, the selecting, based on prioritizing the second resources over the first resources, the one or more transmission resources comprises selecting for the transmission resources from only the one or more candidate resources selected from the second resources.

In some embodiments of the method 900, when a CBR for the first resource pool meets a threshold, the selecting, based on prioritizing the second resources over the first resources, the one or more transmission resources comprises selecting for the transmission resources from only the one or more candidate resources selected from the second resources. In some of these cases, the CBR for the first resource pool is determined relative to only the first resources.

In some embodiments of the method 900, when periodic data is sent on the SL transmission, the selecting, based on prioritizing the second resources over the first resources, the one or more transmission resources comprises selecting for the transmission resources from only the one or more candidate resources selected from the second resources.

Embodiments contemplated herein include an apparatus comprising means to perform one or more elements of the method 900. This apparatus may be, for example, an apparatus of a UE (such as a first wireless device 1602 that is a UE, as described herein).

Embodiments contemplated herein include one or more non-transitory computer-readable media comprising instructions to cause an electronic device, upon execution of the instructions by one or more processors of the electronic device, to perform one or more elements of the method 900. This non-transitory computer-readable media may be, for example, a memory of a UE (such as a memory 1606 of a first wireless device 1602 that is a UE, as described herein).

Embodiments contemplated herein include an apparatus comprising logic, modules, or circuitry to perform one or more elements of the method 900. This apparatus may be, for example, an apparatus of a UE (such as a first wireless device 1602 that is a UE, as described herein).

Embodiments contemplated herein include an apparatus comprising: one or more processors and one or more computer-readable media comprising instructions that, when executed by the one or more processors, cause the one or more processors to perform one or more elements of the method 900. This apparatus may be, for example, an apparatus of a UE (such as a first wireless device 1602 that is a UE, as described herein).

Embodiments contemplated herein include a signal as described in or related to one or more elements of the method 900.

Embodiments contemplated herein include a computer program or computer program product comprising instructions, wherein execution of the program by a processor is to cause the processor to carry out one or more elements of the method 900. The processor may be a processor of a UE (such as a processor(s) 1604 of a first wireless device 1602 that is a UE, as described herein). These instructions may be, for example, located in the processor and/or on a memory of the UE (such as a memory 1606 of a first wireless device 1602 that is a UE, as described herein).

In some embodiments, a UE may use a different power control scheme for resources from an NR SL resource pool that overlap with resources of an LTE SL resource pool than resources that do not. For example, it may be that in NR SL, power control for a resource may depend on a downlink (DL) pathloss or a SL pathloss (on SL unicast). For example, it may be that a first power control scheme for resources of an NR SL resource pool uses $P_{PSSCH}(i)=\min(P_{CMAX}, P_{MAC,CBR}, \min(P_{PSSCH,D}(i), P_{PSSCH,SL}(i)))$, where:

$P_{PSSCH}(i)$ is the power control configuration for the resource (e.g., representing a power level at which the resource is to be transmitted);

$P_{CMAX}$ is a maximum transmit power allowed on the carrier carrying the resource;

$P_{MAC,CBR}$ is a maximum transmit power allowed respective to a current CBR for the NR SL resource pool;

$P_{PSSCH,D}(i)$ is a maximum transmission power allowed for DL; and $P_{PSSCH,SL}(i)$ is a maximum transmission power allowed for SL.

The value of $P_{PSSCH,SL}(i)$ may be determined by using:
$P_{PSSCH,SL}(i)=P_{0,SL}+10 \log_{10}(2\mu \cdot M_{RB}^{PSSCH})+\alpha_{SL}*PL_{SL}$,
where:

$P_{0,SL}$ is a configured nominal power;

$\mu$ is the numerology in use on SL;

$M_{RB}^{PSSCH}$ is the number of RBs for SL;

$\alpha_{SL}$ is a configured scaling for SL pathloss; and $PL_{SL}$ is a SL pathloss.

It may be that a power control scheme for resources of an LTE SL resource pool uses $P_{PSSCH}(i)=\min(P_{CMAX}, P_{MAC,CBR}, P_{PSSCH,D}(i))$.

Accordingly, it may be understood that the first power control scheme for resources of an NR SL resource pool makes power control configuration determinations by considering a SL pathloss (e.g., according to the consideration of $P_{PSSCH,SL}(i)$), while the power control scheme for resources of an LTE SL resource pool (which does not consider $P_{PSSCH,SL}(i)$) makes power control configuration determinations without considering a SL pathloss.

Due to the different formulas, when a resource of the NR SL resource pool and a resource of the LTE SL resource pool overlap, it may be (according to the formulas above) that transmission power control for the resource from the NR SL resource pool and the resource from the LTE SL resource pool are controlled according to potentially different power control configurations (e.g., transmission powers) for each such resource (due to the different formulas used). Specifically, it is possible that the power control configuration for the resource from the NR SL resource pool is more constrained (e.g., in the case that the $P_{PSSCH,SL}(i)$ value controls the transmission power for the first resource) than the power control configuration for the resource from the LTE SL resource pool.

It may be desirable to instead preserve symmetry in treatment as between the overlapped portions of the NR SL resource pool and the LTE SL resource pool, such that resources of one RAT type corresponding to the overlapped region(s) do not receive different or more liberal treatment than resources of the other RAT type corresponding to the overlapped region(s). Accordingly, it may be that a second power control scheme is used for resources of the NR SL resource pool that overlap with resources of the LTE SL resource pool. For such overlapped resources of the NR SL resource pool, this second power control scheme uses $P_{PSSCH,SL}(i)=\min(P_{CMAX}, P_{MAC,CBR}, P_{PSSCH,D}(i))$ in order to preserve symmetry of treatment with the resources of the overlapping LTE SL resource pool. This formula does not take into account SL pathloss.

In some embodiments, the application of the second power control scheme may be for resources of the NR SL resource pool that overlap with the LTE SL resource pool, and resources of the NR SL resource pool that do not overlap with the LTE SL resource pool use instead the first power control scheme discussed previously.

Figure 10:
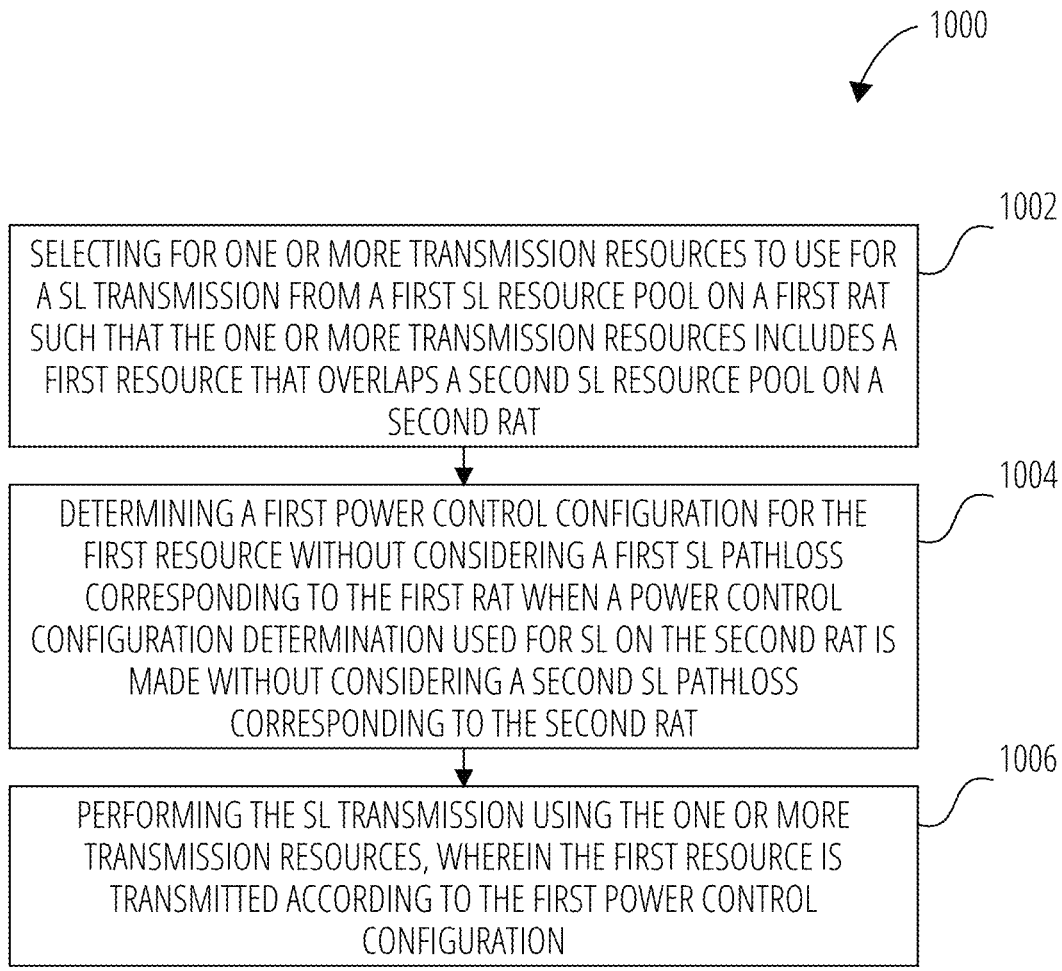
FIG. 10 illustrates a method of a UE, according to an embodiment.

FIG. 10 illustrates a method 1000 of a UE, according to an embodiment. The method 1000 includes selecting 1002 for one or more transmission resources to use for a SL transmission from a first SL resource pool on a first RAT such that the one or more transmission resources includes a first resource that overlaps a second SL resource pool on a second RAT.

The method 1000 further includes determining 1004 determines a first power control configuration for the first resource without considering a first SL pathloss corresponding to the first RAT when a power control configuration determination used for SL on the second RAT is made without considering a second SL pathloss corresponding to the second RAT.

The method 1000 further includes performing 1006 the SL transmission using the one or more transmission resources, wherein the first resource is transmitted according to the first power control configuration.

In some embodiments of the method 1000, the one or more transmission resources is selected for such that the one or more transmission resources includes a second resource that does not overlap the second resource pool; and the method further comprises determining a second power control configuration for the second resource by considering the first SL pathloss, wherein the second resource is transmitted according to the second power control configuration.

Embodiments contemplated herein include an apparatus comprising means to perform one or more elements of the method 1000. This apparatus may be, for example, an apparatus of a UE (such as a first wireless device 1602 that is a UE, as described herein).

Embodiments contemplated herein include one or more non-transitory computer-readable media comprising instructions to cause an electronic device, upon execution of the instructions by one or more processors of the electronic device, to perform one or more elements of the method 1000. This non-transitory computer-readable media may be, for example, a memory of a UE (such as a memory 1606 of a first wireless device 1602 that is a UE, as described herein).

Embodiments contemplated herein include an apparatus comprising logic, modules, or circuitry to perform one or more elements of the method 1000. This apparatus may be, for example, an apparatus of a UE (such as a first wireless device 1602 that is a UE, as described herein).

Embodiments contemplated herein include an apparatus comprising: one or more processors and one or more computer-readable media comprising instructions that, when executed by the one or more processors, cause the one or more processors to perform one or more elements of the method 1000. This apparatus may be, for example, an apparatus of a UE (such as a first wireless device 1602 that is a UE, as described herein).

Embodiments contemplated herein include a signal as described in or related to one or more elements of the method 1000.

Embodiments contemplated herein include a computer program or computer program product comprising instructions, wherein execution of the program by a processor is to cause the processor to carry out one or more elements of the method 1000. The processor may be a processor of a UE (such as a processor(s) 1604 of a first wireless device 1602 that is a UE, as described herein). These instructions may be, for example, located in the processor and/or on a memory of the UE (such as a memory 1606 of a first wireless device 1602 that is a UE, as described herein).

In some embodiments, it may be that a NR SL resource pool uses physical sidelink feedback channels (PSFCHs) in order to provide and/or receive feedback signaling (e.g., acknowledgement and/or negative acknowledgement signaling) to and/or from one or more other UE on SL. For example, an NR SL resource pool may comprise resources that are one slot in time and one subchannel in frequency. Each of these resources may or may not be configured with a PSFCH according to, for example, a bitmap within an NR SL resource pool configuration corresponding to the NR SL resource pool. Bits of this bitmap may correspond to resources having PSFCH locations within the NR SL resource pool, and (depending on bit state) may indicate whether or not the corresponding PSFCH location is available for PSFCH use (e.g., for transmission or reception) at the UE. In resources that have a PSFCH location, the PSFCH location may be the final two or three symbols of the corresponding slot for the resource.

When a portion of such an NR SL resource pool overlaps with a portion of an LTE SL resource pool, it may be beneficial to ensure that PSFCHs are not used in resources of the NR SL resource pool that are overlapped. For example, it may be that LTE SL methods using the LTE SL resource pool have no awareness of the PSFCH use by the NR SL resource pool Accordingly, there is a chance that an attempt to use a PSFCH on a resource of the NR SL resource pool that overlaps with the LTE SL resource pool may be impacted by collision/interference with a transmission performed on LTE using the overlapped resource of the LTE SL resource pool. This may prevent the data of the PSFCH from being properly used.

Figure 11:
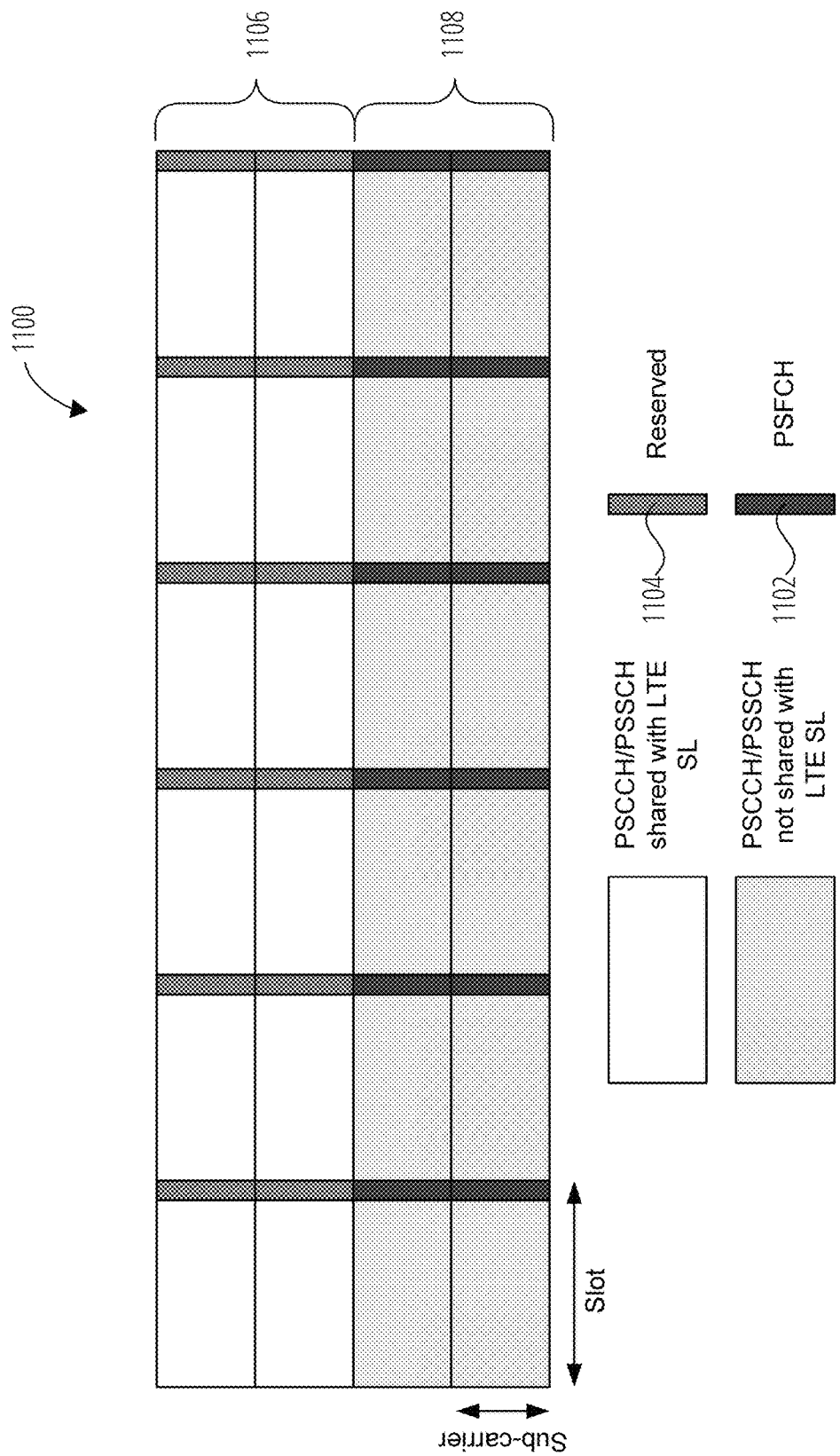
FIG. 11 illustrates a use of PSFCHs within an NR SL resource pool according to an embodiment.

FIG. 11 illustrates a use of PSFCHs within an NR SL resource pool 1100 according to an embodiment. FIG. 11 illustrates a case where PSFCH use is avoided on an overlapped portion 1106 of the NR SL resource pool 1100 that is overlapped by an LTE SL resource pool. The bitmap configuring the PSFCH locations 1102 for use may be understood by the UE to include indications for only those RBs in the frequency domain that correspond to the non-overlapped portion 1108, and be further understood to carry no indications corresponding to the RBs in the frequency domain that correspond to the overlapped portion 1106. Accordingly, the reserved portions 1104 of the NR SL resource pool 1100 are not understood by the UE to be possible locations for PSFCHs. Accordingly, any PSFCHs eventually used may be in one or more PSFCH locations 1102 of the non-overlapped portion 1108 of the NR SL resource pool 1100.

Figure 12:
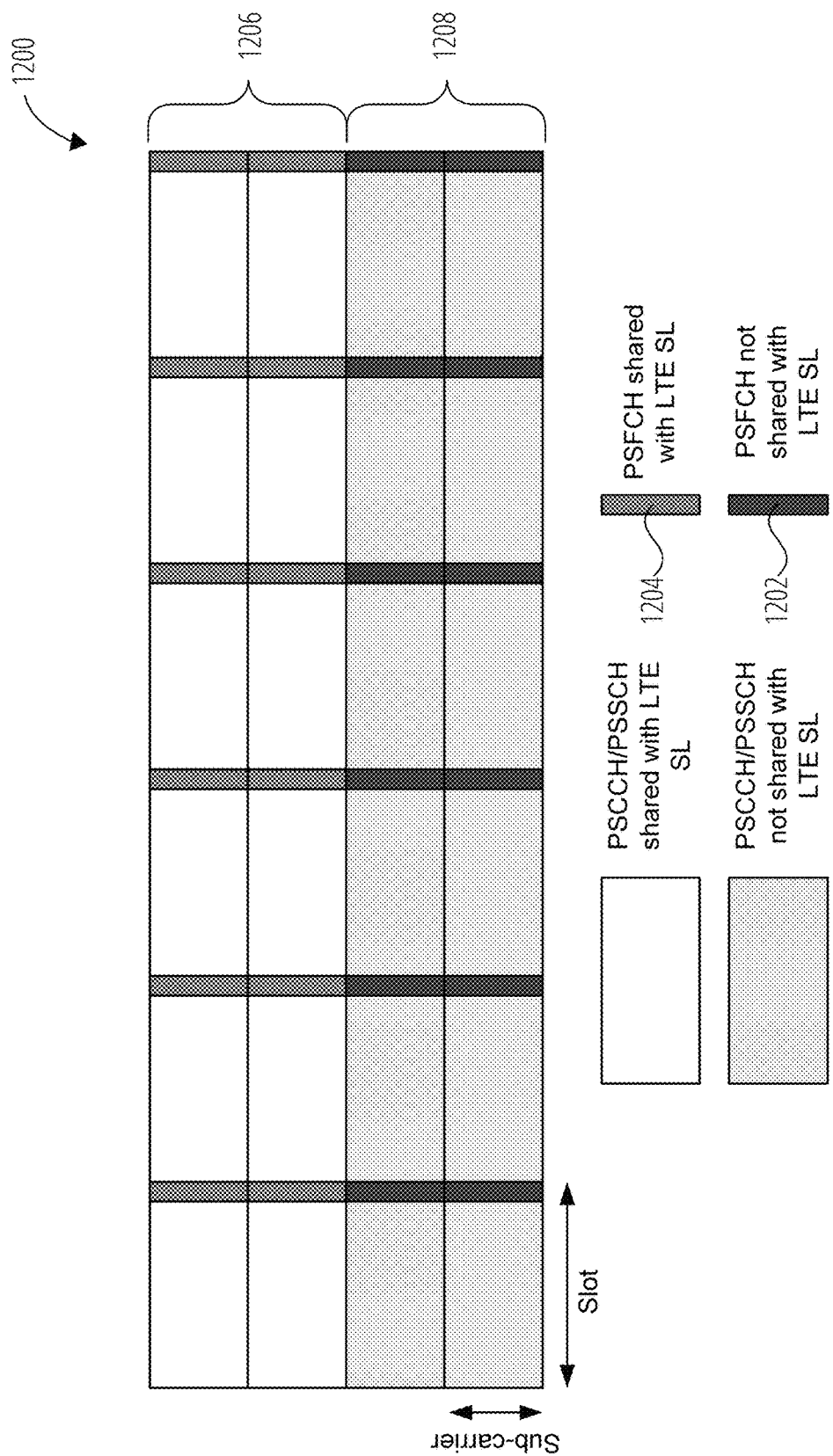
FIG. 12 illustrates a use of PSFCHs within an NR SL resource pool according to an embodiment.

FIG. 12 illustrates a use of PSFCHs within an NR SL resource pool 1200 according to an embodiment. FIG. 12 illustrates a case where PSFCH use is avoided on an overlapped portion 1206 of the NR SL resource pool 1200 that is overlapped by an LTE SL resource pool. The bitmap configuring the PSFCH resources may be understood by the UE to include indications corresponding to possible PSFCH locations for all RBs in the frequency domain that correspond to the NR SL resource pool 1200. Accordingly, the bitmap includes indications for each of the non-overlapped PSFCH locations 1202 and the overlapped PSFCH locations 1204. However, the indications for the overlapped PSFCH locations 1204 may all be set to zero. Accordingly, the overlapped PSFCH locations 1204 may not be used for PSFCHs. Accordingly, any PSFCHs eventually used may be in one or more of the non-overlapped PSFCH locations 1202 of the non-overlapped portion 1208 of the NR SL resource pool 1200.

Figure 13:
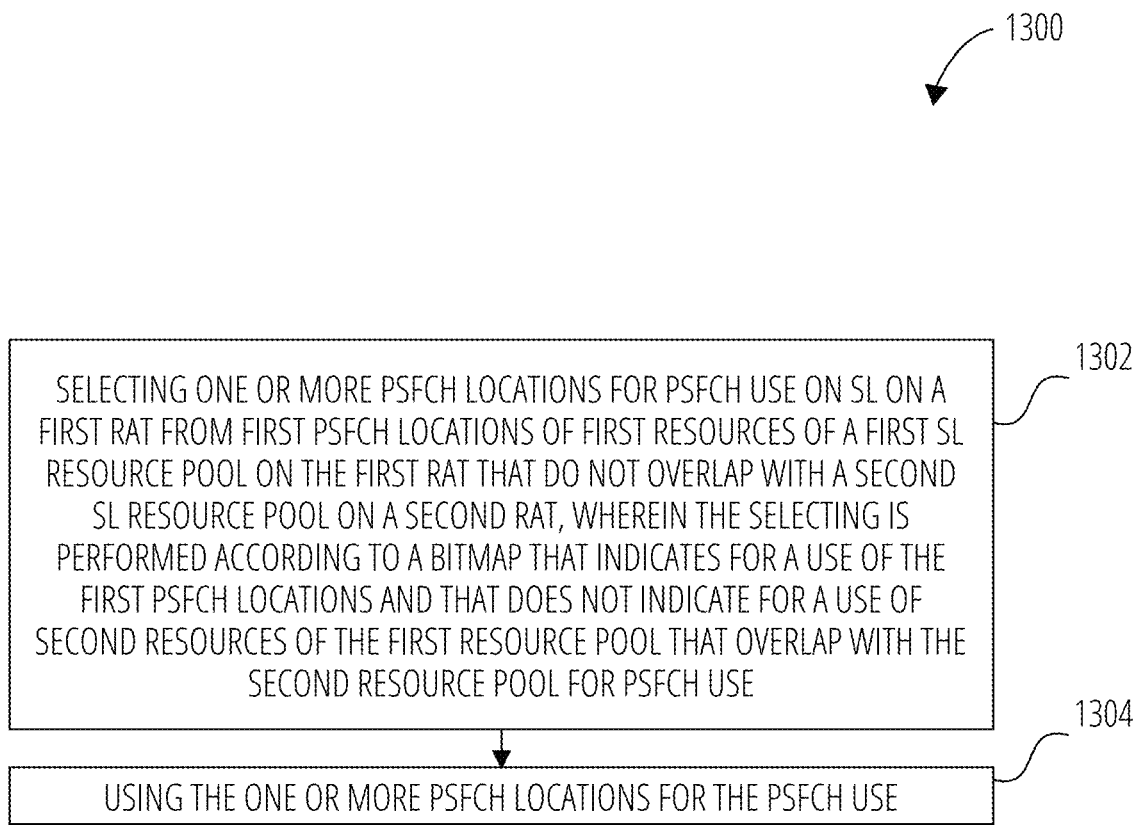
FIG. 13 illustrates a method of a UE, according to an embodiment.

FIG. 13 illustrates a method 1300 of a UE, according to an embodiment. The method 1300 includes selecting 1302s one or more PSFCH locations for PSFCH use on SL on a first RAT from first PSFCH locations of first resources of a first SL resource pool on the first RAT that do not overlap with a second SL resource pool on a second RAT, wherein the selecting is performed according to a bitmap that indicates for a use of the first PSFCH locations and that does not indicate for a use of second resources of the first resource pool that overlap with the second resource pool for PSFCH use.

The method 1300 further comprises using 1304 the one or more PSFCH locations for the PSFCH use.

In some embodiments of the method 1300, the second resources comprise second PSFCH locations.

In some embodiments of the method 1300, the PSFCH use comprises one of receiving SL feedback and transmitting SL feedback.

Embodiments contemplated herein include an apparatus comprising means to perform one or more elements of the method 1300. This apparatus may be, for example, an apparatus of a UE (such as a first wireless device 1602 that is a UE, as described herein).

Embodiments contemplated herein include one or more non-transitory computer-readable media comprising instructions to cause an electronic device, upon execution of the instructions by one or more processors of the electronic device, to perform one or more elements of the method 1300. This non-transitory computer-readable media may be, for example, a memory of a UE (such as a memory 1606 of a first wireless device 1602 that is a UE, as described herein).

Embodiments contemplated herein include an apparatus comprising logic, modules, or circuitry to perform one or more elements of the method 1300. This apparatus may be, for example, an apparatus of a UE (such as a first wireless device 1602 that is a UE, as described herein).

Embodiments contemplated herein include an apparatus comprising: one or more processors and one or more computer-readable media comprising instructions that, when executed by the one or more processors, cause the one or more processors to perform one or more elements of the method 1300. This apparatus may be, for example, an apparatus of a UE (such as a first wireless device 1602 that is a UE, as described herein).

Embodiments contemplated herein include a signal as described in or related to one or more elements of the method 1300.

Embodiments contemplated herein include a computer program or computer program product comprising instructions, wherein execution of the program by a processor is to cause the processor to carry out one or more elements of the method 1300. The processor may be a processor of a UE (such as a processor(s) 1604 of a first wireless device 1602 that is a UE, as described herein). These instructions may be, for example, located in the processor and/or on a memory of the UE (such as a memory 1606 of a first wireless device 1602 that is a UE, as described herein).

It may be that within an NR SL resource pool configured for PSFCH use, a UE can perform only one of PSFCH transmission and PSFCH reception during a single slot. Accordingly, when a UE is scheduled to perform both PSFCH transmission and PSFCH reception during a same slot, it may use various rules to select between PSFCH transmission and PSFCH reception during that slot.

In such circumstances, it may be that the PSFCH transmission is scheduled to occur using a first number of the PSFCH resources in the slot (PSFCH transmission resources), and the PSFCH reception may be scheduled to occur using a second number of the PSFCH resources in the slot (PSFCH reception resources) that may be (at least partially) different from the PSFCH transmission resources in the slot.

It may also be the case that an NR SL resource pool overlaps (at least in part) with an LTE SL resource pool, and that either (some) PSFCH transmission resources of the slot or (some) PSFCH reception resources of the slot overlap with the LTE SL resource pool. Accordingly, when the UE selects one of the PSFCH reception and the PSFCH transmission, it may be configured to use a pool sharing rule that prioritizes a one of the PSFCH reception and the PSFCH transmission that uses only PSFCH resources that are not overlapped with the LTE SL resource pool (if this circumstance exists for one of the set of PSFCH transmission resources and the set of PSFCH reception resources).

It may also be that the UE implements a data priority rule that prioritizes the one of the PSFCH transmission and the PSFCH reception that is for data of a relatively higher priority than the data of the other of the PSFCH transmission and the PSFCH reception. When either of the PSFCH transmission or the PSFCH reception involve multiple PSFCHs with data of varying priority, the data with the highest priority in the PSFCH transmission or PSFCH reception may be used relative to that PSFCH transmission or PSFCH reception.

To determine which of the PSFCH transmission and the PSFCH reception to perform, the UE may apply the pool sharing rule first, and then later apply the data priority rule if the pool sharing rule is not determinative. Alternatively, the UE may apply the data priority rule first, and then later apply the pool sharing rule if the data priority rule is not determinative.

It is also contemplated that these same rules could be applied in an alternative case where the UE is scheduled to send more PSFCH transmissions than it has the capability for. This can occur in cases where, for example, the UE receives SCI scheduling the transmissions from different UEs, or multiple SCI scheduling the transmissions from the same UE, and the associated PSFCHs appear in the same slot. In such a case, these rules could be used as described herein to select a subset of the scheduled PSFCH transmissions to send that is within the UE's transmission capability.

Figure 14:
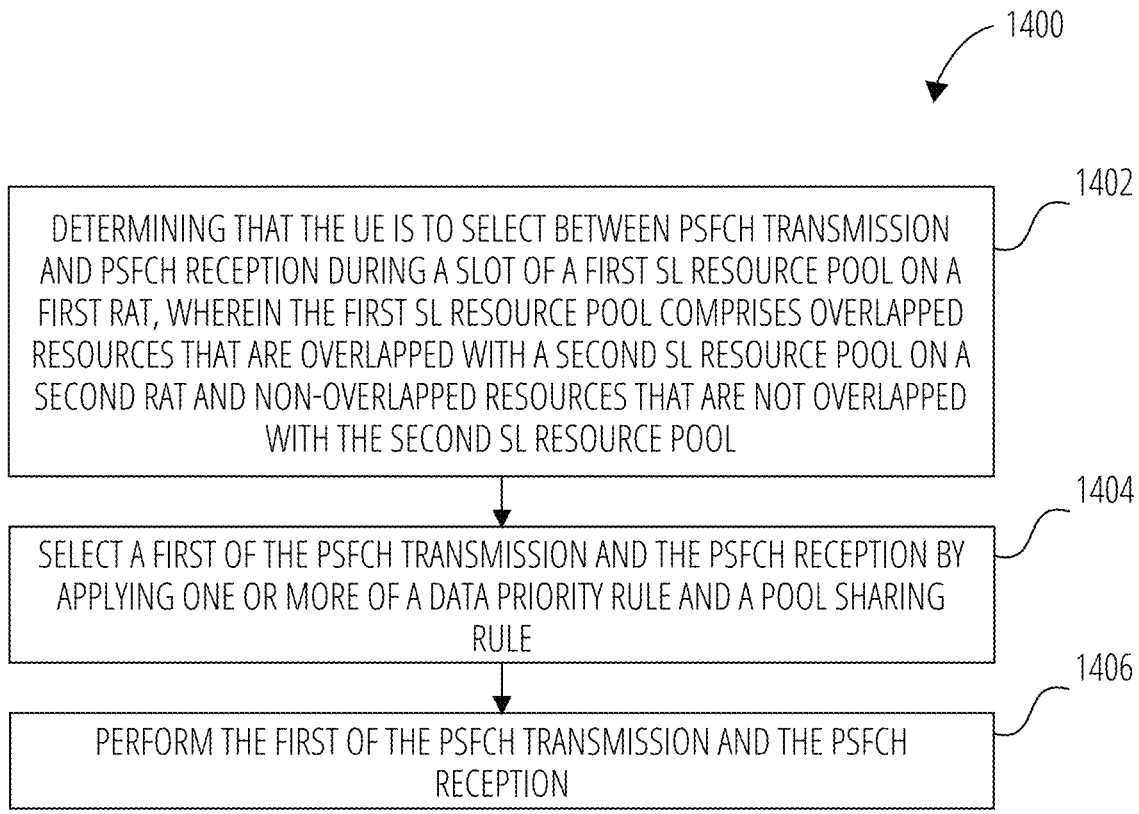
FIG. 14 illustrates a method of a UE, according to an embodiment.

FIG. 14 illustrates a method 1400 of a UE, according to an embodiment. The method 1400 includes determining 1402 that the UE is to select between PSFCH transmission and PSFCH reception during a slot of a first SL resource pool on a first RAT, wherein the first SL resource pool comprises overlapped resources that are overlapped with a second SL resource pool on a second RAT and non-overlapped resources that are not overlapped with the second SL resource pool.

The method 1400 further includes selecting 1404 a first of the PSFCH transmission and the PSFCH reception by applying one or more of a data priority rule and a pool sharing rule. In some embodiments, the data priority rule prioritizes the first of the PSFCH transmission and the PSFCH reception when it uses first data of a first priority that is higher than any priority of data used by a second of the PSFCH transmission and the PSFCH reception. In some embodiments, the pool sharing rule prioritizes the first of the PSFCH transmission and the PSFCH reception when it does not use any of the overlapped resources and when the second of the PSFCH transmission and the PSFCH reception uses at least one of the overlapped resources.

The method 1400 further includes performing 1406 the first of the PSFCH transmission and the PSFCH reception.

In some embodiments of the method 1400, the applying one or more of the data priority rule and the pool sharing rule comprises applying the pool sharing rule after applying the data priority rule when no data of the first of the PSFCH transmission and the PSFCH reception has a higher priority than any data of the second of the PSFCH transmission and the PSFCH reception.

In some embodiments of the method 1400, the applying one or more of the data priority rule and the pool sharing rule comprises applying the data priority rule after applying the pool sharing rule when each of the PSFCH transmission and the PSFCH reception use at least one of the overlapped resources.

In some embodiments of the method 1400, the applying one or more of the data priority rule and the pool sharing rule comprises applying the data priority rule after applying the pool sharing rule when neither of the PSFCH transmission and the PSFCH reception use any of the overlapped resources.

Embodiments contemplated herein include an apparatus comprising means to perform one or more elements of the method 1400. This apparatus may be, for example, an apparatus of a UE (such as a first wireless device 1602 that is a UE, as described herein).

Embodiments contemplated herein include one or more non-transitory computer-readable media comprising instructions to cause an electronic device, upon execution of the instructions by one or more processors of the electronic device, to perform one or more elements of the method 1400. This non-transitory computer-readable media may be, for example, a memory of a UE (such as a memory 1606 of a first wireless device 1602 that is a UE, as described herein).

Embodiments contemplated herein include an apparatus comprising logic, modules, or circuitry to perform one or more elements of the method 1400. This apparatus may be, for example, an apparatus of a UE (such as a first wireless device 1602 that is a UE, as described herein).

Embodiments contemplated herein include an apparatus comprising: one or more processors and one or more computer-readable media comprising instructions that, when executed by the one or more processors, cause the one or more processors to perform one or more elements of the method 1400. This apparatus may be, for example, an apparatus of a UE (such as a first wireless device 1602 that is a UE, as described herein).

Embodiments contemplated herein include a signal as described in or related to one or more elements of the method 1400.

Embodiments contemplated herein include a computer program or computer program product comprising instructions, wherein execution of the program by a processor is to cause the processor to carry out one or more elements of the method 1400. The processor may be a processor of a UE (such as a processor(s) 1604 of a first wireless device 1602 that is a UE, as described herein). These instructions may be, for example, located in the processor and/or on a memory of the UE (such as a memory 1606 of a first wireless device 1602 that is a UE, as described herein).

Figure 15:
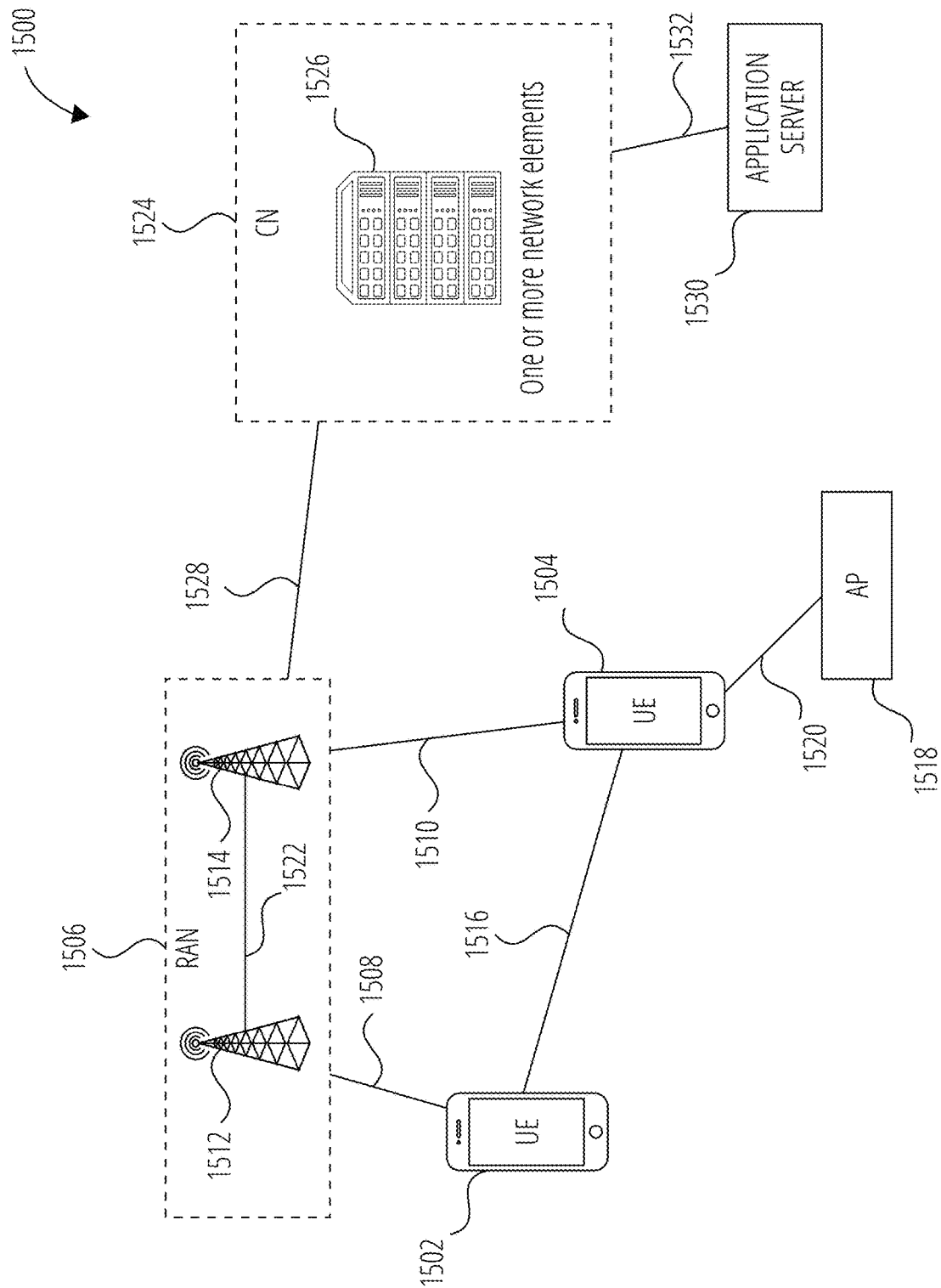
FIG. 15 illustrates an example architecture of a wireless communication system, according to embodiments disclosed herein.

FIG. 15 illustrates an example architecture of a wireless communication system 1500, according to embodiments disclosed herein. The following description is provided for an example wireless communication system 1500 that operates in conjunction with the LTE system standards and/or 5G or NR system standards as provided by 3GPP technical specifications.

As shown by FIG. 15, the wireless communication system 1500 includes UE 1502 and UE 1504 (although any number of UEs may be used). In this example, the UE 1502 and the UE 1504 are illustrated as smartphones (e.g., handheld touchscreen mobile computing devices connectable to one or more cellular networks), but may also comprise any mobile or non-mobile computing device configured for wireless communication.

The UE 1502 and UE 1504 may be configured to communicatively couple with a RAN 1506. In embodiments, the RAN 1506 may be NG-RAN, E-UTRAN, etc. The UE 1502 and UE 1504 utilize connections (or channels) (shown as connection 1508 and connection 1510, respectively) with the RAN 1506, each of which comprises a physical communications interface. The RAN 1506 can include one or more base stations, such as base station 1512 and base station 1514, that enable the connection 1508 and connection 1510.

In this example, the connection 1508 and connection 1510 are air interfaces to enable such communicative coupling, and may be consistent with RAT(s) used by the RAN 1506, such as, for example, an LTE and/or NR.

In some embodiments, the UE 1502 and UE 1504 may also directly exchange communication data via a sidelink interface 1516. The UE 1504 is shown to be configured to access an access point (shown as AP 1518) via connection 1520. By way of example, the connection 1520 can comprise a local wireless connection, such as a connection consistent with any IEEE 802.11 protocol, wherein the AP 1518 may comprise a Wi-Fi® router. In this example, the AP 1518 may be connected to another network (for example, the Internet) without going through a CN 1524.

In embodiments, the UE 1502 and UE 1504 can be configured to communicate using orthogonal frequency division multiplexing (OFDM) communication signals with each other or with the base station 1512 and/or the base station 1514 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 1512 or base station 1514 may be implemented as one or more software entities running on server computers as part of a virtual network. In addition, or in other embodiments, the base station 1512 or base station 1514 may be configured to communicate with one another via interface 1522. In embodiments where the wireless communication system 1500 is an LTE system (e.g., when the CN 1524 is an EPC), the interface 1522 may be an X2 interface. The X2 interface may be defined between two or more base stations (e.g., two or more eNBs and the like) that connect to an EPC, and/or between two eNBs connecting to the EPC. In embodiments where the wireless communication system 1500 is an NR system (e.g., when CN 1524 is a 5GC), the interface 1522 may be an Xn interface. The Xn interface is defined between two or more base stations (e.g., two or more gNBs and the like) that connect to 5GC, between a base station 1512 (e.g., a gNB) connecting to 5GC and an eNB, and/or between two eNBs connecting to 5GC (e.g., CN 1524).

The RAN 1506 is shown to be communicatively coupled to the CN 1524. The CN 1524 may comprise one or more network elements 1526, which are configured to offer various data and telecommunications services to customers/subscribers (e.g., users of UE 1502 and UE 1504) who are connected to the CN 1524 via the RAN 1506. The components of the CN 1524 may be implemented in one physical device or separate physical devices including components to read and execute instructions from a machine-readable or computer-readable medium (e.g., a non-transitory machine-readable storage medium).

In embodiments, the CN 1524 may be an EPC, and the RAN 1506 may be connected with the CN 1524 via an S1 interface 1528. In embodiments, the S1 interface 1528 may be split into two parts, an S1 user plane (S1-U) interface, which carries traffic data between the base station 1512 or base station 1514 and a serving gateway (S-GW), and the S1-MME interface, which is a signaling interface between the base station 1512 or base station 1514 and mobility management entities (MMEs).

In embodiments, the CN 1524 may be a 5GC, and the RAN 1506 may be connected with the CN 1524 via an NG interface 1528. In embodiments, the NG interface 1528 may be split into two parts, an NG user plane (NG-U) interface, which carries traffic data between the base station 1512 or base station 1514 and a user plane function (UPF), and the S1 control plane (NG-C) interface, which is a signaling interface between the base station 1512 or base station 1514 and access and mobility management functions (AMFs).

Generally, an application server 1530 may be an element offering applications that use internet protocol (IP) bearer resources with the CN 1524 (e.g., packet switched data services). The application server 1530 can also be configured to support one or more communication services (e.g., VoIP sessions, group communication sessions, etc.) for the UE 1502 and UE 1504 via the CN 1524. The application server 1530 may communicate with the CN 1524 through an IP communications interface 1532.

Figure 16:
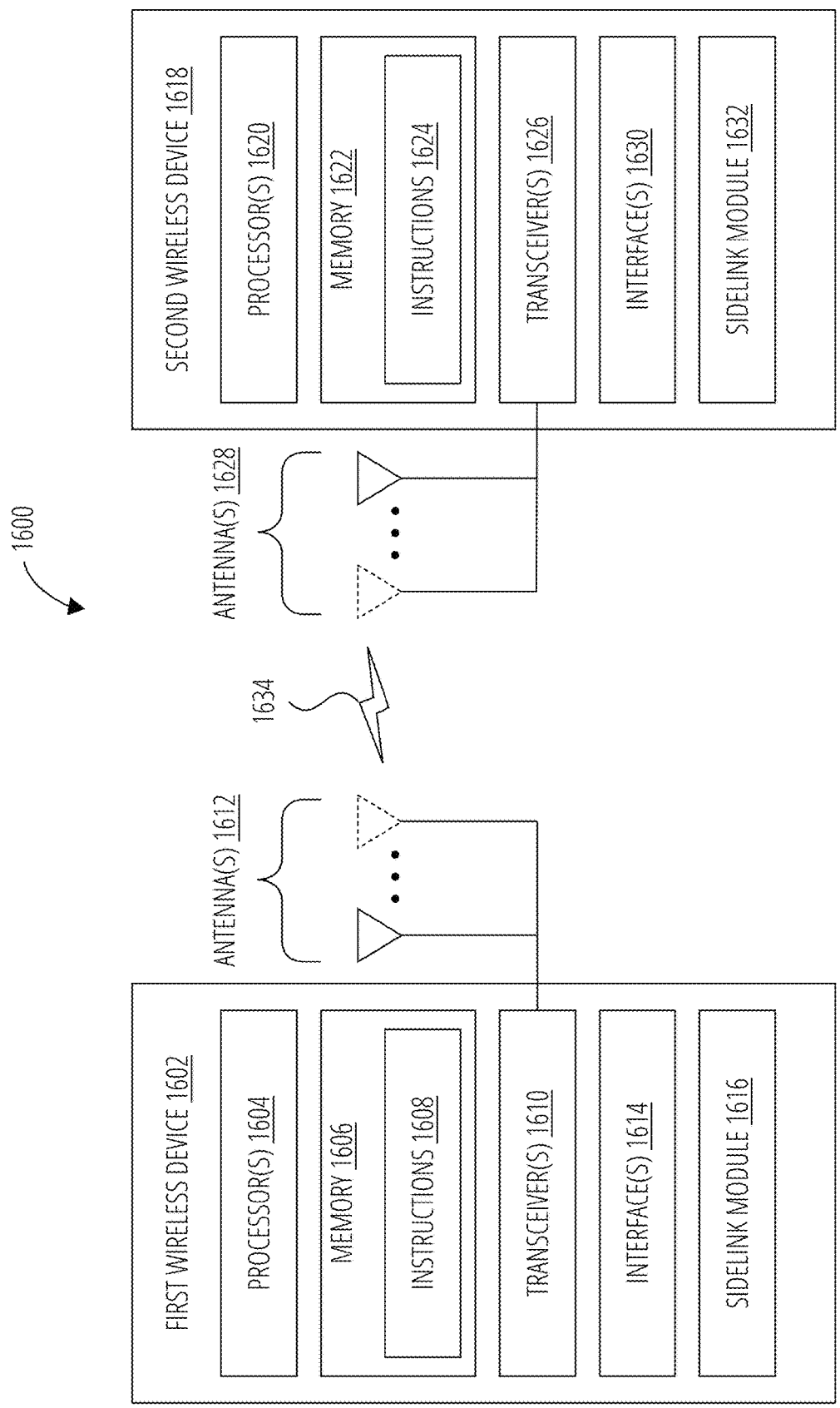
FIG. 16 illustrates a system for performing signaling between a first wireless device and a second wireless device, according to embodiments disclosed herein.

FIG. 16 illustrates a system 1600 for performing signaling 1634 between a first wireless device 1602 and a second wireless device 1618, according to embodiments disclosed herein. The system 1600 may be a portion of a wireless communications system as herein described. The first wireless device 1602 may be, for example, a UE of a wireless communication system. The second wireless device 1618 may be, for example, an IE of the wireless communication system.

The first wireless device 1602 may include one or more processor(s) 1604. The processor(s) 1604 may execute instructions such that various operations of the first wireless device 1602 are performed, as described herein. The processor(s) 1604 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The first wireless device 1602 may include a memory 1606. The memory 1606 may be a non-transitory computer-readable storage medium that stores instructions 1608 (which may include, for example, the instructions being executed by the processor(s) 1604). The instructions 1608 may also be referred to as program code or a computer program. The memory 1606 may also store data used by, and results computed by, the processor(s) 1604.

The first wireless device 1602 may include one or more transceiver(s) 1610 that may include radio frequency (RF) transmitter and/or receiver circuitry that use the antenna(s) 1612 of the first wireless device 1602 to facilitate signaling (e.g., the signaling 1634) to and/or from the first wireless device 1602 with other devices (e.g., the second wireless device 1618) according to corresponding RATs.

The first wireless device 1602 may include one or more antenna(s) 1612 (e.g., one, two, four, or more). For embodiments with multiple antenna(s) 1612, the first wireless device 1602 may leverage the spatial diversity of such multiple antenna(s) 1612 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the first wireless device 1602 may be accomplished according to precoding (or digital beamforming) that is applied at the first wireless device 1602 that multiplexes the data streams across the antenna(s) 1612 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the first wireless device 1602 may implement analog beamforming techniques, whereby phases of the signals sent by the antenna(s) 1612 are relatively adjusted such that the (joint) transmission of the antenna(s) 1612 can be directed (this is sometimes referred to as beam steering).

The first wireless device 1602 may include one or more interface(s) 1614. The interface(s) 1614 may be used to provide input to or output from the first wireless device 1602. For example, a first wireless device 1602 that is a UE may include interface(s) 1614 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 1610/antenna(s) 1612 already described) that allow for communication between the UE and other devices and may operate according to known protocols (e.g., Wi-Fi®, Bluetooth®, and the like).

The first wireless device 1602 may include a sidelink module 1616. The sidelink module 1616 may be implemented via hardware, software, or combinations thereof. For example, the sidelink module 1616 may be implemented as a processor, circuit, and/or instructions 1608 stored in the memory 1606 and executed by the processor(s) 1604. In some examples, the sidelink module 1616 may be integrated within the processor(s) 1604 and/or the transceiver(s) 1610. For example, the sidelink module 1616 may be implemented by a combination of software components (e.g., executed by a DSP or a general processor) and hardware components (e.g., logic gates and circuitry) within the processor(s) 1604 or the transceiver(s) 1610.

The sidelink module 1616 may be used for various aspects of the present disclosure, for example, aspects of FIG. 1 to FIG. 14. For example, the sidelink module 1616 may be configured to select, based on prioritizing non-overlapped resources over overlapped resources, one or more candidate resources; select, based on prioritizing non-overlapped resources over overlapped resources, one or more transmission resources from one or more candidate resources; determine a first power control configuration for a transmission resource without considering a first SL pathloss corresponding to a first RAT when a power control configuration determination used for SL on a second RAT is made without considering a second SL pathloss corresponding to the second RAT; selecting one or more PSFCH locations for PSFCH use on SL on a first RAT from first PSFCH locations of resources of a first SL resource pool on the first RAT that do not overlap with a second SL resource pool on a second RAT according to a bitmap; and/or select one of a PSFCH transmission and a PSFCH reception by applying one or more of a data priority rule and a pool sharing rule; as described herein.

The second wireless device 1618 may include one or more processor(s) 1620. The processor(s) 1620 may execute instructions such that various operations of the second wireless device 1618 are performed, as described herein. The processor(s) 1620 may include one or more baseband processors implemented using, for example, a CPU, a DSP, an ASIC, a controller, an FPGA device, another hardware device, a firmware device, or any combination thereof configured to perform the operations described herein.

The second wireless device 1618 may include a memory 1622. The memory 1622 may be a non-transitory computer-readable storage medium that stores instructions 1624 (which may include, for example, the instructions being executed by the processor(s) 1620). The instructions 1624 may also be referred to as program code or a computer program. The memory 1622 may also store data used by, and results computed by, the processor(s) 1620.

The second wireless device 1618 may include one or more transceiver(s) 1626 that may include RF transmitter and/or receiver circuitry that use the antenna(s) 1628 of the second wireless device 1618 to facilitate signaling (e.g., the signaling 1634) to and/or from the second wireless device 1618 with other devices (e.g., the first wireless device 1602) according to corresponding RATs.

The second wireless device 1618 may include one or more antenna(s) 1628 (e.g., one, two, four, or more). In embodiments having multiple antenna(s) 1628, the second wireless device 1618 may perform MIMO, digital beam-forming, analog beamforming, beam steering, etc., as has been described.

The second wireless device 1618 may include one or more interface(s) 1630. The interface(s) 1630 may be used to provide input to or output from the second wireless device 1618. For example, a second wireless device 1618 that is a UE may include interface(s) 1630 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 1626/antenna(s) 1628 already described) that allow for communication between the UE and other devices and may operate according to known protocols (e.g., Wi-Fi®, Bluetooth®, and the like).

The second wireless device 1618 may include a sidelink module 1632. The sidelink module 1632 may be implemented via hardware, software, or combinations thereof. For example, the sidelink module 1632 may be implemented as a processor, circuit, and/or instructions 1624 stored in the memory 1622 and executed by the processor(s) 1620. In some examples, the sidelink module 1632 may be integrated within the processor(s) 1620 and/or the transceiver(s) 1626. For example, the sidelink module 1632 may be implemented by a combination of software components (e.g., executed by a DSP or a general processor) and hardware components (e.g., logic gates and circuitry) within the processor(s) 1620 or the transceiver(s) 1626.

The sidelink module 1632 may be used for various aspects of the present disclosure, for example, aspects of FIG. 1 through FIG. 14. For example, similarly to as was described in relation to the sidelink module 1616, the sidelink module 1632 may (in addition to the sidelink module 1616, or independently of any configuration of the sidelink module 1616) be configured to select, based on prioritizing non-overlapped resources over overlapped resources, one or more candidate resources; select, based on prioritizing non-overlapped resources over overlapped resources, one or more transmission resources from one or more candidate resources; determine a first power control configuration for a transmission resource without considering a first SL pathloss corresponding to a first RAT when a power control configuration determination used for SL on a second RAT is made without considering a second SL pathloss corresponding to the second RAT; selecting one or more PSFCH locations for PSFCH use on SL on a first RAT from first PSFCH locations of resources of a first SL resource pool on the first RAT that do not overlap with a second SL resource pool on a second RAT according to a bitmap; and/or select one of a PSFCH transmission and a PSFCH reception by applying one or more of a data priority rule and a pool sharing rule; as described herein.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method of a user equipment (UE) configured with a first sidelink (SL) resource pool on a first radio access technology (RAT) that comprises first resources that do not overlap with a second SL resource pool on a second RAT and second resources that overlap with the second SL resource pool on the second RAT, comprising:

selecting one or more physical sidelink feedback channel (PSFCH) locations for PSFCH use on SL on the first RAT from first PSFCH locations of the first resources that do not overlap with the second SL resource pool, wherein the selecting is performed according to a bitmap that indicates for a use of the first PSFCH locations of the first resources that do not overlap with the second SL resource pool and that does not indicate for a use of the second resources of the first SL resource pool that overlap with the second SL resource pool; and using the one or more PSFCH locations for the PSFCH use.

2. The method of claim 1, wherein the second resources comprise second PSFCH locations.

3. The method of claim 1, wherein the PSFCH use comprises one of receiving SL feedback and transmitting SL feedback.

4. A method of a user equipment (UE), comprising:

determining that the UE is to select between physical sidelink feedback channel (PSFCH) transmission and PSFCH reception during a slot of a first sidelink (SL) resource pool on a first radio access technology (RAT), wherein the first SL resource pool comprises overlapped resources that are overlapped with a second SL resource pool on a second RAT and non-overlapped resources that are not overlapped with the second SL resource pool;

selecting a first of the PSFCH transmission and the PSFCH reception by applying one or more of a data priority rule and a pool sharing rule, wherein the data priority rule prioritizes the first of the PSFCH transmission and the PSFCH reception when it uses first data of a first priority that is higher than any priority of data used by a second of the PSFCH transmission and the PSFCH reception; and wherein the pool sharing rule prioritizes the first of the PSFCH transmission and the PSFCH reception when it does not use any of the overlapped resources and when the second of the PSFCH transmission and the PSFCH reception uses at least one of the overlapped resources; and performing the first of the PSFCH transmission and the PSFCH reception.

5. The method of claim 4, wherein the applying one or more of the data priority rule and the pool sharing rule comprises applying the pool sharing rule after applying the data priority rule when no data of the first of the PSFCH transmission and the PSFCH reception has a higher priority than any data of the second of the PSFCH transmission and the PSFCH reception.

6. The method of claim 4, wherein the applying one or more of the data priority rule and the pool sharing rule comprises applying the data priority rule after applying the pool sharing rule when each of the PSFCH transmission and the PSFCH reception use at least one of the overlapped resources.

7. The method of claim 4, wherein the applying one or more of the data priority rule and the pool sharing rule comprises applying the data priority rule after applying the pool sharing rule when neither of the PSFCH transmission and the PSFCH reception use any of the overlapped resources.

8. An apparatus of a user equipment (UE), comprising:
one or more processors and,
a memory storing instructions that, when executed by the one or more processors, configure the UE to:
determine that the UE is to select between physical sidelink feedback channel (PSFCH) transmission and PSFCH reception during a slot of a first sidelink (SL) resource pool on a first radio access technology (RAT), wherein the first SL resource pool comprises overlapped resources that are overlapped with a second SL resource pool on a second RAT and non-overlapped resources that are not overlapped with the second SL resource pool;
select a first of the PSFCH transmission and the PSFCH reception by applying one or more of a data priority rule and a pool sharing rule,
wherein the data priority rule prioritizes the first of the PSFCH transmission and the PSFCH reception when it uses first data of a first priority that is higher than any priority of data used by a second of the PSFCH transmission and the PSFCH reception; and
wherein the pool sharing rule prioritizes the first of the PSFCH transmission and the PSFCH reception when it does not use any of the overlapped resources and when the second of the PSFCH transmission and the PSFCH reception uses at least one of the overlapped resources; and
perform the first of the PSFCH transmission and the PSFCH reception.

9. The apparatus of claim 8, wherein the instructions, when executed by the one or more processors, further configure the UE to apply the one or more of the data priority rule and the pool sharing rule by applying the pool sharing rule after applying the data priority rule when no data of the first of the PSFCH transmission and the PSFCH reception has a higher priority than any data of the second of the PSFCH transmission and the PSFCH reception.

10. The apparatus of claim 8, wherein the instructions, when executed by the one or more processors, further configure the UE to apply the one or more of the data priority rule and the pool sharing rule by applying the data priority rule after applying the pool sharing rule when each of the PSFCH transmission and the PSFCH reception use at least one of the overlapped resources.

11. The apparatus of claim 8, wherein the instructions, when executed by the one or more processors, further configure the UE to apply the one or more of the data priority rule and the pool sharing rule by applying the data priority rule after applying the pool sharing rule when neither of the PSFCH transmission and the PSFCH reception use any of the overlapped resources.

* * * * *